(12) United States Patent
Morales Teraoka et al.

(10) Patent No.: US 9,849,876 B2
(45) Date of Patent: Dec. 26, 2017

(54) COLLISION AVOIDANCE ASSISTANCE DEVICE FOR A VEHICLE

(71) Applicant: TOYOTA JIDOSHA KABUSHIKI KAISHA, Toyota-shi, Aichi-ken (JP)

(72) Inventors: Edgar Yoshio Morales Teraoka, Susono (JP); Shin Tanaka, Numazu (JP); Yoshitaka Oikawa, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/171,005

(22) Filed: Jun. 2, 2016

(65) Prior Publication Data

US 2016/0355181 A1 Dec. 8, 2016

(30) Foreign Application Priority Data

Jun. 5, 2015 (JP) .................................. 2015-114893

(51) Int. Cl.
*B60W 30/00* (2006.01)
*B60W 10/00* (2006.01)
(Continued)

(52) U.S. Cl.
CPC .......... *B60W 30/0956* (2013.01); *B60Q 1/04* (2013.01); *B60Q 5/006* (2013.01); *B60R 1/00* (2013.01); *B60W 10/184* (2013.01); *B60W 10/20* (2013.01); *B60W 30/14* (2013.01); *G06K 9/00369* (2013.01); *G06K 9/00805* (2013.01); *G08G 1/166* (2013.01); *B60W 2520/06* (2013.01); *B60W 2550/10* (2013.01)

(58) Field of Classification Search
CPC ....... B60W 10/00; B60W 30/00; G01S 13/04; G08G 1/166
See application file for complete search history.

(56) References Cited

U.S. PATENT DOCUMENTS 7,315,799 B1 * 1/2008 Podolsky ................ F03D 80/00
703/2
9,090,205 B2 * 7/2015 Nagaoka ................ B60Q 9/008
(Continued)

FOREIGN PATENT DOCUMENTS

EP 1898232 A1 3/2008
EP 2636561 A1 9/2013
(Continued)

*Primary Examiner* — Yonel Beaulieu
(74) *Attorney, Agent, or Firm* — Sughrue Mion, PLLC

(57) ABSTRACT

A collision avoidance assistance device for a vehicle is provided. The collision avoidance assistance device includes a camera configured to acquire an image of an area around the vehicle and a controller. The controller is configured to: detect an image of an animal in the image of the area around the vehicle; determine a type of the animal detected in the image; retrieve behavior characteristics index values representing behavior characteristics of the determined type of the animal; calculate a future presence area of the animal based on the behavior characteristics index values; determine a probability of a collision between the animal and the vehicle based on the calculated future presence area of the animal; and perform a collision avoidance assistance function based on the determined probability of the collision between the animal and the vehicle.

19 Claims, 10 Drawing Sheets

(51) Int. Cl.
*G08G 1/16* (2006.01)
*G01S 13/04* (2006.01)
*B60W 30/095* (2012.01)
*B60W 30/14* (2006.01)
*B60Q 1/04* (2006.01)
*B60Q 5/00* (2006.01)
*B60R 1/00* (2006.01)
*B60W 10/184* (2012.01)
*B60W 10/20* (2006.01)
*G06K 9/00* (2006.01)

(56) References Cited

U.S. PATENT DOCUMENTS

| | | | |
|---|---|---|---|
| 9,421,910 B1* | 8/2016 | Waltermann | B60Q 1/085 |
| 2011/0096956 A1 | 4/2011 | Aimura et al. | |
| 2013/0238186 A1 | 9/2013 | Aimura | |
| 2016/0202443 A1* | 7/2016 | Knutsson | B60R 11/04 348/148 |
| 2016/0339910 A1* | 11/2016 | Jonasson | G05D 1/0061 |
| 2017/0024618 A1* | 1/2017 | Morales Teraoka | B60W 30/09 |

FOREIGN PATENT DOCUMENTS

| | | |
|---|---|---|
| JP | 2009-301283 A | 12/2009 |
| JP | 2010-009372 A | 1/2010 |
| JP | 2010-020401 A | 1/2010 |
| JP | 2010-092429 A | 4/2010 |
| JP | 2010-108507 A | 5/2010 |
| JP | 2010-113550 A | 5/2010 |
| JP | 2012-513651 A | 6/2012 |
| JP | 2013-184483 A | 9/2013 |
| WO | 2010/072195 A2 | 7/2010 |
| WO | 2015/032512 A1 | 3/2015 |

\* cited by examiner

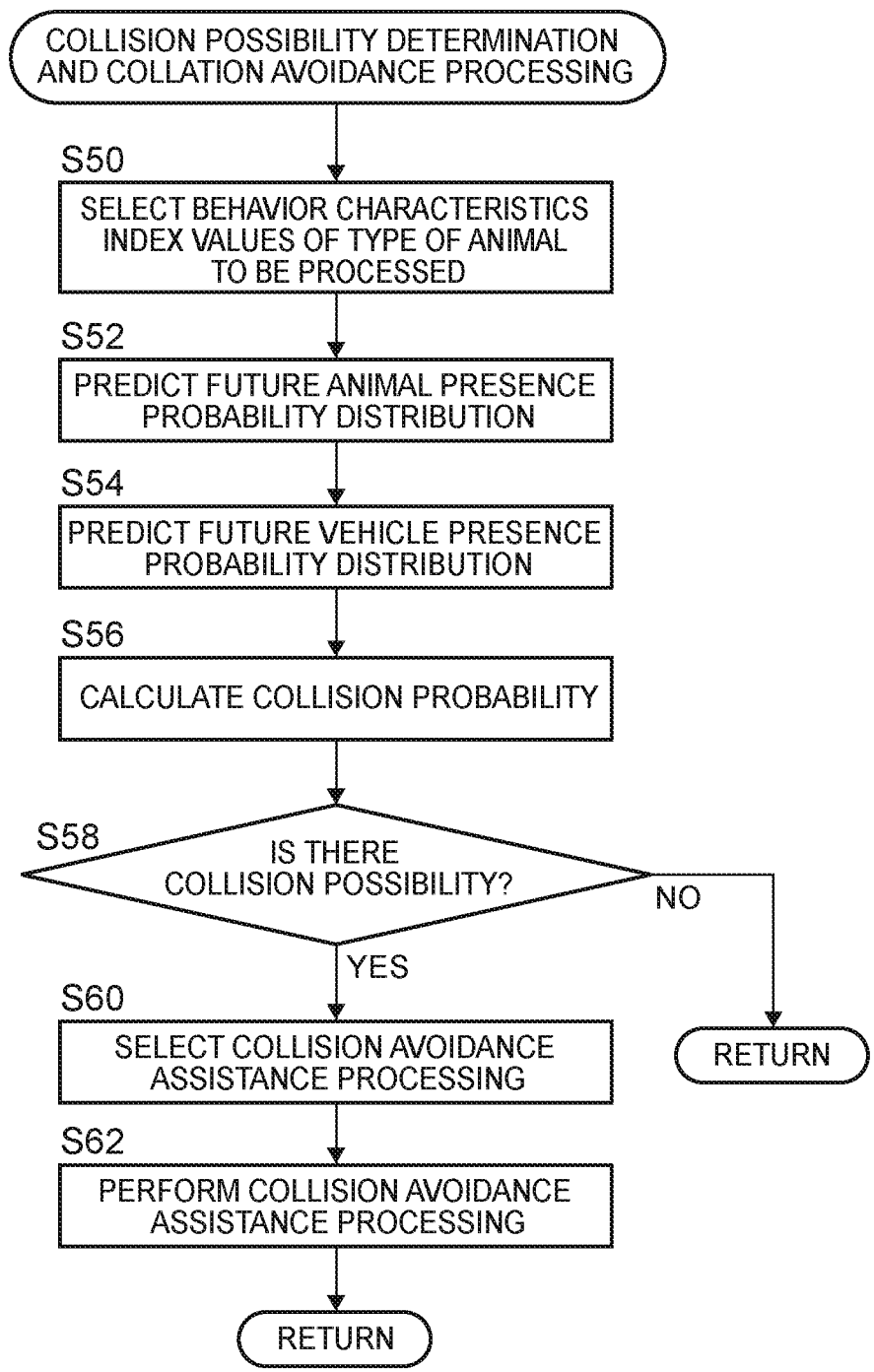

FIG. 8

| TYPE | BEHAVIOR | SPEED JERK Jik | ANGULAR DISPLACEMENT θik | MAXIMUM SPEED Vmaik | BEHAVIOR PROBABILITY Pik |
|---|---|---|---|---|---|
| DEER | STOP | J11 | θ11 | Vma11 | P11 |
| | RUN AWAY (FORWARD) | J12 | θ12 | Vma12 | P12 |
| | RUN AWAY (BACKWARD) | J13 | θ13 | Vma13 | P13 |
| | KEEP ON MOVING | J14 | θ14 | Vma14 | P14 |
| | ⋮ | ⋮ | ⋮ | ⋮ | ⋮ |
| OX | STOP | J21 | θ21 | Vma21 | P21 |
| | RUN AWAY (FORWARD) | J22 | θ22 | Vma22 | P22 |
| | RUN AWAY (BACKWARD) | J23 | θ23 | Vma23 | P23 |
| | KEEP ON MOVING | J24 | θ24 | Vma24 | P24 |
| | ⋮ | ⋮ | ⋮ | ⋮ | ⋮ |
| HORSE | STOP | J31 | θ31 | Vma31 | P31 |
| | RUN AWAY (FORWARD) | J32 | θ32 | Vma32 | P32 |
| | RUN AWAY (BACKWARD) | J33 | θ33 | Vma33 | P33 |
| | KEEP ON MOVING | J34 | θ34 | Vma34 | P34 |
| | ⋮ | ⋮ | ⋮ | ⋮ | ⋮ |
| ⋮ | ⋮ | ⋮ | ⋮ | ⋮ | ⋮ |

| TYPE | BEHAVIOR | SPEED JERK Jik | ANGULAR DISPLACEMENT θik | MAXIMUM SPEED Vmaik | BEHAVIOR PROBABILITY Pik |
|---|---|---|---|---|---|
| GROUP OF DEER | STOP | J101 | θ101 | Vma101 | P101 |
| | RUN AWAY (FORWARD) | J102 | θ102 | Vma102 | P102 |
| | RUN AWAY (BACKWARD) | J103 | θ103 | Vma103 | P103 |
| | KEEP ON MOVING | J104 | θ104 | Vma104 | P104 |
| | ⋮ | ⋮ | ⋮ | ⋮ | ⋮ |
| GROUP OF OXEN | STOP | J201 | θ201 | Vma201 | P201 |
| | RUN AWAY (FORWARD) | J202 | θ202 | Vma202 | P202 |
| | RUN AWAY (BACKWARD) | J203 | θ203 | Vma203 | P203 |
| | KEEP ON MOVING | J204 | θ204 | Vma204 | P204 |
| | ⋮ | ⋮ | ⋮ | ⋮ | ⋮ |
| GROUP OF HORSES | STOP | J301 | θ301 | Vma301 | P301 |
| | RUN AWAY (FORWARD) | J302 | θ302 | Vma302 | P302 |
| | RUN AWAY (BACKWARD) | J303 | θ303 | Vma303 | P303 |
| | KEEP ON MOVING | J304 | θ304 | Vma304 | P304 |
| | ⋮ | ⋮ | ⋮ | ⋮ | ⋮ |
| ⋮ | ⋮ | ⋮ | ⋮ | ⋮ | ⋮ |

COLLISION AVOIDANCE ASSISTANCE DEVICE FOR A VEHICLE

CROSS-REFERENCE TO RELATED APPLICATIONS

This application claims priority to Japanese Patent Application No. 2015-114893, filed on Jun. 5, 2015, the disclosure of which, including the specification, drawings and abstract, is incorporated herein by reference in its entirety.

BACKGROUND

1. Field

Apparatuses and methods consistent with the exemplary embodiments relate to a collision avoidance assistance technology for a vehicle such as an automobile, and more particularly to a device for avoiding collisions between a traveling vehicle and an animal.

2. Description of Related Art

In the field of the driving assistance technology for a vehicle such as an automobile, various configurations are proposed for a system that monitors the area ahead of a traveling vehicle using an on-vehicle video camera or a radar sensor and, when an object such as other vehicles, a person, or an animal is detected, predicts the possibility of collision with the object to assist the driver in avoiding collision with the object. For example, Japanese Patent Application Publication No. 2010-020401 (JP 2010-020401 A) and Japanese Patent Application Publication No. 2010-108507 (JP 2010-108507 A) disclose a configuration that determines whether an object detected in an image, captured by the on-vehicle camera, is a person or a tetrapod. If the detected image is the image of a tetrapod, the configuration estimates the tetrapod's presence area after the movement of the tetrapod, considering that the tetrapod is most likely to move in the direction of its head. Then, the configuration determines whether the estimated tetrapod's presence area overlaps with the vehicle's future presence area to detect the possibility of collision.

Japanese Patent Application Publication No. 2009-301283 (JP 2009-301283 A) proposes a configuration that, when there is a possibility of collision with an object, changes the frequency and the time, at which the possibility of collision is notified, between the case where the object is a person and the case where the object is a tetrapod. In addition, for the method for recognizing whether an object detected in a captured image is a tetrapod, Japanese Patent Application Publication No. 2010-113550 (JP 2010-113550 A), Japanese Patent Application Publication No. 2010-092429 (JP 2010-092429 A), and Japanese Patent Application Publication No. 2010-009372 (JP 2010-009372 A) propose a configuration that determines whether the object is a tetrapod by determining whether the angle of the vector indicating the posture of the image of the object changes periodically (Japanese Patent Application Publication No. 2010-113550 (JP 2010-113550 A)), by determining whether the image element corresponding to the motion of the legs changes in the configuration of the lower part of the image of the object (Japanese Patent Application Publication No. 2010-092429 (JP 2010-092429 A)), or by determining whether the image of the object has an image element corresponding to the backbone and the four legs of a tetrapod (Japanese Patent Application Publication No. 2010-009372 (JP 2010-009372 A)).

In general, animals (for example, livestock such as a horse, ox, and sheep and wild animals such as a deer, wild goat, bear, kangaroo) that may enter the traveling road of a vehicle differ in the behavior pattern or the behavior characteristics according to the type. For example, the behavior of an animal when a vehicle approaches the animal depends on the type of the animal; the animal runs away (flees) from the vehicle, stands transfixed where the animal is, approaches the vehicle, or runs into the traveling road. The moving speed and the moving direction of the animal also differ among animal types. Therefore, when an animal is detected in the image of the traveling road in the traveling direction of the vehicle or in the image of its surroundings, the type of the animal must be identified; otherwise, it is difficult to estimate where the animal will move after it is detected, that is, the position where the animal will exist or the area where the animal is likely to exist in the future. In addition, it may become difficult to accurately determine the possibility of collision between the vehicle and the animal. On this point, if the object is an animal and if the type of the animal is not identified and the tendency of the behavior cannot be predicted, it is not known in which direction and at what speed the image of the animal in the captured image will move. Therefore, in predicting the animal's future presence area, it may become necessary to understand the tendency of the behavior of the animal or to make an image analysis of a relatively large area in the image for tracking the image of the animal. However, because the image information is four-dimensional information having the two-dimensional coordinate values, brightness, and time, the calculation load and the processing time are significantly increased as the analysis range of the image area becomes larger. This means that the quick implementation of collision possibility determination and collision avoidance assistance requires higher-performance calculation processing device and memory, resulting in an increase in the cost.

In addition, when the behavior characteristics of animals differ among animal types, efficient assistance for collision avoidance also differs among animal types. When a warning by sound and light is issued to an animal detected ahead of the vehicle, the reaction differs among animal types; some animals are highly sensitive to the warning and move away from the vehicle and some other animals do not react to the warning at all and enter the traveling road with little or no change in the behavior. In particular, in the former case, collision can be avoided by issuing a warning by sound or light with no need to apply the brake or to perform a steering operation on the vehicle. In the latter case, collision can be avoided by applying the brake or by performing the steering operation on the vehicle. Conversely, when collision can be avoided only by issuing a warning, driving assistance by applying the brake or by performing the steering operation on the vehicle is not necessary. Similarly, when collision can be avoided by applying the brake or performing the steering operation on the vehicle, the generation of a warning is not necessary. Therefore, when an animal is detected as an object in the image of the traveling road in the traveling direction of the vehicle or in the image of its surroundings, it is preferable that assistance for collision avoidance be provided in a more suitable mode according to the type of the animal.

SUMMARY

According to an exemplary embodiment, a collision avoidance assistance device for a vehicle is provided that identifies the type of an animal when the animal is detected in the traveling road of the vehicle or its surroundings. After that, the collision avoidance assistance device estimates the animal's future presence area more accurately based on the behavior characteristics of the type and determines the possibility of collision.

According to an aspect an exemplary embodiment, a collision avoidance assistance device for a vehicle includes:

a capturing unit configured to acquire an image around the vehicle;

an animal image detection unit configured to detect presence/absence of an image of an animal in the image;

an animal type determination unit configured to determine a type of an animal when an image of the animal is detected in the image;

an animal presence area prediction unit configured to predict a future presence area of the animal based on behavior characteristics index values representing behavior characteristics of the determined type of the animal;

a collision possibility determination unit configured to determine a possibility of collision of the animal with the vehicle based on a prediction result of the future presence area of the animal; and an assistance processing performing unit configured to perform assistance processing for collision avoidance when it is determined that there is a possibility of collision of the animal with the vehicle.

In the above configuration, the type of the "animal" may be a horse, an ox, a sheep, a deer, a wild goat, a bear, a kangaroo, or any other tetrapod. The "behavior characteristics of the determined type of the animal" may be the characteristics (tendency of the determined type of an animal to select a behavior pattern or the probability with which various patterns are selected) of various behavior patterns (or behavior mode) of the animal when the vehicle approaches the animal, for example, the possible behavior patterns indicating that the animal runs away (flees) from the vehicle, remains in that position (stands transfixed), or runs into the traveling road. The "behavior characteristics index values" may be values representing the "behavior characteristics" of each animal type. The "behavior characteristics index values" may be a flag value attached to each piece of information on the behavior characteristics that are obtained in advance through an investigation and may be generated for an individual animal type. More specifically, as will be described later, the value may be a value that is obtained in advance through an investigation and that indicates the generation probability for a possible behavior mode generated for an individual animal type or a value that represents the movement speed and/or direction in a possible behavior mode. In the "prediction of a future presence area of the animal" that is made using the "behavior characteristics index values", an area defined by a boundary within which the animal will be present in the future or a future movement path may be predicted as an actual area. As will be described later in detail, a distribution of the animal's future presence areas in the planar area around the vehicle may be determined. In the embodiment, the animal presence area prediction unit may include a behavior characteristics index value storage unit that stores in advance a group of data on the "behavior characteristics index values" of an animal of a type supposed to enter a traveling road of the vehicle and may select the behavior characteristics index values of the determined type of the animal from the group of data stored in the behavior characteristics index value storage unit. The capturing unit described above may be an on-vehicle camera that captures the surroundings of the vehicle and generates an image. The animal image detection unit and the animal type determination unit may be implemented in any mode by a unit that detects the image of an animal in the captured image and determines the type of the animal using any image processing method such as the edge extraction method or pattern matching method.

According to the configuration described above, when the image of an animal is detected in the image around the vehicle acquired by the capturing unit, such as an on-vehicle camera, while the vehicle is traveling, the type of the animal is first determined and, using the information on the "behavior characteristics" of the determined type of animal, the presence area of the animal is predicted. In this case, the behavior characteristics of the detected animal type are reflected on the information on the predicted presence area of the animal. Therefore, it is expected that the prediction result is more precise or more accurate than before. This makes it possible to determine the possibility of whether the animal, detected in the image of the surroundings of the vehicle, will collide with the vehicle more precisely and more accurately.

In the aspect described above, the collision avoidance assistance device for a vehicle may further include an assistance processing selection unit configured to select a mode of the assistance processing for collision avoidance based on the determined type of the animal. In addition, the assistance processing performing unit may be configured to perform the assistance processing for the selected mode. As already described above, the behavior characteristics of an animal when the vehicle approaches the animal differ according to the type. Therefore, the assistance efficient for collision avoidance differs according to the animal type. For example, the generation of a warning is efficient for an animal of the type that reacts to sound or light and moves away from the vehicle. The assistance by braking or steering the vehicle for allowing the vehicle to avoid entering the presence area of the animal is efficient for an animal of the type that does not react to a warning and enters the traveling road. That is, the mode of efficient assistance processing differs according to the determined type of the animal. Therefore, if an animal is detected around the vehicle and there is a possibility that the animal will collide with the vehicle, the mode of assistance processing may also be selected according to the type of the animal. This mode allows for the provision of more suitable driving assistance for collision avoidance. This also reduces discomfort and strangeness in the surroundings or reduces those of the driver or occupants.

In the aspect described above, the prediction of the future presence area performed by the animal presence area prediction unit, in more detail, the prediction result, may be represented in various modes. For example, in one mode, the prediction result may be represented by a trajectory, beginning at the position where the animal is detected, in the image in the planar area around the vehicle. In addition, an area where the animal may be present in the future after some time has elapsed from the time the animal is detected in the image may be defined as the prediction result. In addition, as will be described in Detailed Description of the Embodiments, the prediction result may be represented as a distribution of future presence probabilities of the animal in the planar area around the vehicle. The animal's future presence area is predicted using the current direction, position, and movement speed of the animal, obtained from the image, and the behavior characteristics index values of the determined animal type (for example, the value indicating the generation probability of a possible behavior mode and the value representing the movement speed and/or direction in a possible behavior mode in the determined type of animal as described above). Therefore, because the behavior characteristics of the determined type of the animal are reflected on the prediction result of the animal's future presence area, it is expected that the result is more precise or more accurate. In addition, in determining the possibility of collision, the area to be processed or the area to be analyzed can be narrowed down. This leads to a reduction in the calculation load and the processing time. In addition, in the aspect described above, the animal presence area prediction unit may be configured to generate a distribution of future presence probabilities of the animal in a planar area around the vehicle as the prediction result of the future presence area of the animal using the behavior characteristics index values of the determined type of the animal and the current direction, position, and movement speed of the animal. In addition, the behavior characteristics index values of the determined type of the animal may include the movement direction and the movement speed of the animal that may be generated in the behavior pattern expected in the determined type of the animal as well we the generation probability of that behavior pattern.

The behavior mode or pattern may differ according to the animal type between when the animal is present as an individual and when the animal belongs to a group. Therefore, in the aspect described above, the animal type determination unit may be configured to determine whether the animal, the image of which is detected in the image, belongs to a group and, if the behavior characteristics differ between when the animal of the determined type belongs to a group and when the animal is present as an individual, the animal presence area prediction unit may be configured to predict the future presence area of the animal using the behavior characteristics index values that differ between when the animal in the image is determined to form a group and when the animal is not determined to form a group. This further increases the accuracy in the prediction result of the animal's future presence area when the animal belongs to a group.

The determination of the possibility of collision of an animal with the vehicle in the aspect described above is described shortly as follows. The possibility of collision of the animal with the vehicle is determined by referencing the prediction result of the animal's future presence area, obtained by considering the behavior characteristics of the animal type as described above, to determine whether the animal will enter the traveling path or the future presence area of the vehicle. To determine the collision possibility more accurately in this processing, the collision avoidance assistance device for a vehicle in the aspect described above may further include a vehicle presence area prediction unit that predicts a future presence area of the vehicle wherein the collision possibility determination unit may be configured to determine whether there is a possibility of collision of the animal with the vehicle based on the prediction result of the future presence area of the animal and a prediction result of the future presence area of the vehicle. In predicting the vehicle's future presence area, the prediction result may be represented by a future trajectory, determined based on the motion state such as the vehicle speed, from the current vehicle position, or an area where the vehicle may be present in the future after some time has elapsed from the time the animal is detected in the image may be defined as the prediction result. In addition, as will be described in Detailed Description of the Embodiments, the prediction result may be represented as a distribution of future presence probabilities of the vehicle in the planar area around the vehicle. In that case, the collision possibility determination unit may be configured to determine the possibility of collision of the animal with the vehicle based on the distribution of animal's future presence probabilities and the distribution of vehicle's future presence probabilities. More specifically, as will be described later, it may be determined that there is a possibility of collision if there are an area or position with a high probability of the presence of the animal and an area or position with a high probability of the presence of the vehicle within the range of a predetermined distance or if there is an area where the animal and the vehicle are present at the same time with a high probability in the planar area around the vehicle.

Various devices have been proposed that detect whether there is an animal around a traveling vehicle, determine the possibility of collision, and perform the assistance processing for collision avoidance. However, these devices do not perform processing for determining the animal type and, therefore, do not predict the animal behavior by considering the difference in the behavior characteristics that depend on the animal type. In that case, even if the presence of an animal is detected around the vehicle while the vehicle is traveling, the behavior of the detected animal, such as the moving direction or moving speed, cannot substantially be determined and, therefore, it is difficult to predict the future presence area accurately.

On the other hand, in the aspect described above, if an animal is detected around a traveling vehicle, the type of the animal is first determined as described above, the behavior characteristics of the animal of that type are referenced and, then, it can be predicted for each animal type how the animal will move after that around the vehicle. This ability therefore allows the animal's presence area or a likely area to be estimated accurately and allows the possibility of collision of the animal with the vehicle to be predicted accurately as described above, making it possible to precisely determine whether to perform assistance for collision avoidance. In addition, because the future predicted behavior tendency is measured according to the detected type of the animal as described above, the area, where the processing related to collision avoidance assistance is to be performed, is selectively determined (narrowed). This will lead to a reduction in the calculation load and the processing time and will make it possible to speed up the determination of the possibility of collision, the determination of the requirement for assistance processing, and the provision of the assistance processing. In addition, in a configuration in which the assistance processing mode is determined according to the animal type, more efficient assistance can be performed for the detected animal and, therefore, it is advantageous in that unnecessary assistance need not be performed.

According to another aspect of an exemplary embodiment, a collision avoidance assistance device for a vehicle includes: a capturing device acquiring an image around the vehicle; and an electronic control device. The electronic control device implements functions of an animal image detection unit configured to detect presence or absence of an image of an animal in the image, an animal type determination unit configured to determine a type of an animal when an image of the animal is detected in the image, an animal presence area prediction unit configured to predict a future presence area of the animal based on behavior characteristics index values representing behavior characteristics of the determined type of the animal, a collision possibility determination unit configured to determine a possibility of collision of the animal with the vehicle based on a prediction result of the future presence area of the animal, and an assistance processing performing unit configured to perform assistance processing for collision avoidance when it is determined that there is a possibility of collision of the animal with the vehicle.

According to another aspect of an exemplary embodiment, a collision avoidance assistance device for a vehicle is provided. The collision avoidance assistance device may include a camera configured to acquire an image of an area around the vehicle; and a controller configured to: detect an image of an animal in the image of the area around the vehicle; determine a type of the animal detected in the image; retrieve behavior characteristics index values representing behavior characteristics of the determined type of the animal; calculate a future presence area of the animal based on the behavior characteristics index values; determine a probability of a collision between the animal and the vehicle based on the calculated future presence area of the animal; and perform a collision avoidance assistance function based on the determined probability of the collision between the animal and the vehicle.

The controller may be further configured to detect an image of a tetrapod in the image of the area around the vehicle.

The controller may be further configured to: select a mode of the collision avoidance assistance function based on the determined type of the animal, and perform the collision avoidance assistance function according to the selected mode.

The controller may be further configured to: determine a direction, position and movement speed of the animal based on a plurality of images acquired from the camera; and calculate a distribution of future presence probabilities of the animal in a planar area around the vehicle using the behavior characteristics index values of the determined type of the animal and the determined direction, position, and movement speed of the animal.

The controller may be further configured to: calculate a future presence area of the vehicle; and determine the probability of the collision between the animal and the vehicle based on the calculated future presence area of the animal and the calculated future presence area of the vehicle.

The controller may be further configured to: calculate a distribution of future presence probabilities of the vehicle in the planar area around the vehicle, and determine the probability of the collision between the animal and the vehicle based on the distribution of future presence probabilities of the animal and the distribution of future presence probabilities of the vehicle.

The collision avoidance assistance device may further include a memory, and the controller may be further configured to retrieve the behavior characteristics index values of the determined type of the animal from the memory.

The behavior characteristics index values of the determined type of the animal may include a movement direction and a movement speed of the animal corresponding to a behavior pattern and a generation probability of the behavior pattern, the behavior pattern being a pattern of behavior that may be expected for the determined type of the animal.

The controller may be further configured to: calculate a future presence area of the vehicle; and determine the probability of the collision between the animal and the vehicle based on the calculated future presence area of the animal and the calculated future presence area of the vehicle.

The controller may be further configured to: determine, based on the image of the area around the vehicle, whether the animal is part of a group of animals; and, in response to the determining that the animal is part of the group of animals, calculate the future presence area of the animal based on group behavior characteristics index values of the animal.

According to another aspect of an exemplary embodiment, a vehicle comprising a collision avoidance assistance device is provided. The collision avoidance assistance device may include a camera configured to acquire an image of an area around the vehicle; and an electronic control device. The electronic control device may be configured to: detect an image of an animal in the image of the area around the vehicle, determine a type of the animal detected in the image, retrieve behavior characteristics index values representing behavior characteristics of the determined type of the animal, calculate a future presence area of the animal based on the behavior characteristics index values, determine a probability of a collision between the animal and the vehicle based on the calculated future presence area of the animal, and perform a collision avoidance assistance function based on the determined probability of the collision between the animal and the vehicle.

According to another aspect of an exemplary embodiment, a collision avoidance method for a vehicle includes is provided. The collision avoidance method may include: acquiring an image of an area around the vehicle; detecting an image of an animal in the image of the area around the vehicle; determining a type of the animal detected in the image; retrieving behavior characteristics index values representing behavior characteristics of the determined type of the animal; calculating a future presence area of the animal based on the behavior characteristics index values; determining a probability of a collision between the animal and the vehicle based on the calculated future presence area of the animal; and performing a collision avoidance assistance function based on the determined probability of the collision between the animal and the vehicle.

The detecting the image of the animal in the image of the area around the vehicle may include detecting an image of a tetrapod in the image of the area around the vehicle.

The collision avoidance method may further include: selecting a mode of the collision avoidance assistance function based on the determined type of the animal, and performing the collision avoidance assistance function according to the selected mode.

The collision avoidance method may further include: acquiring a plurality of images of the area around the vehicle; determining a direction, position and movement speed of the animal based on the plurality of images acquired from the camera; and calculating a distribution of future presence probabilities of the animal in a planar area around the vehicle using the behavior characteristics index values of the determined type of the animal and the determined direction, position, and movement speed of the animal.

The collision avoidance method may further include: calculating a future presence area of the vehicle; and determining the probability of the collision between the animal and the vehicle based on the calculated future presence area of the animal and the calculated future presence area of the vehicle.

The collision avoidance method may further include: calculating a distribution of future presence probabilities of the vehicle in the planar area around the vehicle, and determining the probability of the collision between the animal and the vehicle based on the distribution of future presence probabilities of the animal and the distribution of future presence probabilities of the vehicle.

The collision avoidance method may further include pre-storing the behavior characteristics index values in a memory, wherein the retrieving the behavior characteristics index values comprises retrieving the behavior characteristics index values from the memory;

The behavior characteristics index values may include a movement direction and a movement speed of the animal corresponding to a behavior pattern and a generation probability of the behavior pattern, the behavior pattern being a pattern of behavior that may be expected for the determined type of the animal.

The collision avoidance method may further include: calculating a future presence area of the vehicle; and determining the probability of the collision between the animal and the vehicle based on the calculated future presence area of the animal and the calculated future presence area of the vehicle.

The collision avoidance method may further include: determining, based on the image of the area around the vehicle, whether the animal is part of a group of animals; and in response to the determining that the animal is part of the group of animals, calculating the future presence area of the animal based on group behavior characteristics index values of the animal.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a flowchart showing an embodiment of the processing operation in an assistance control ECU of the collision avoidance assistance device according to an exemplary embodiment;

FIG. 8 is a diagram showing an example of the list of animal's behavior characteristics index values by animal type that is used for predicting the animal's future presence area;

DETAILED DESCRIPTION OF EMBODIMENTS

Figure 1A:
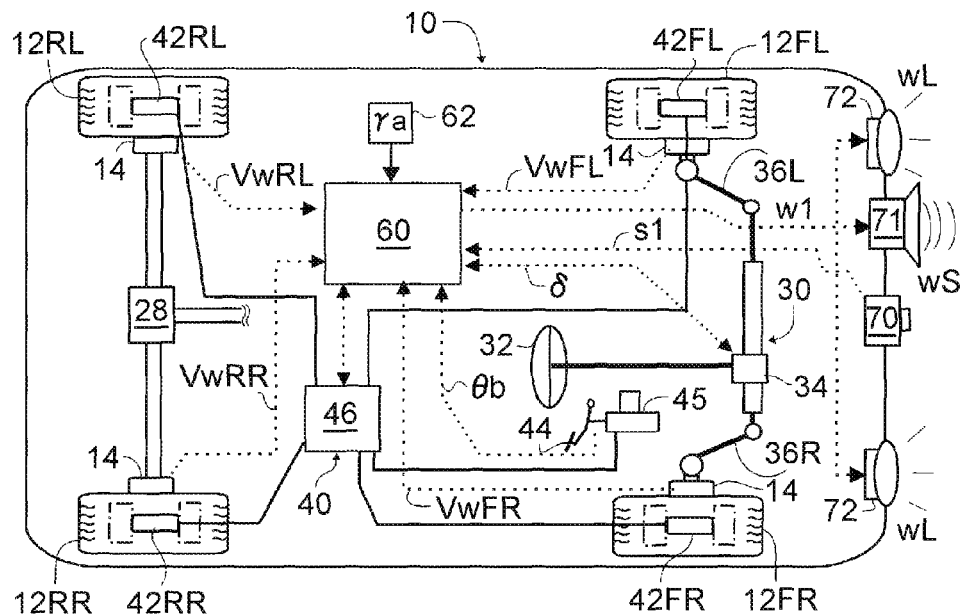
FIG. 1A is a schematic plan view of a vehicle on which an embodiment of a collision avoidance assistance device according to an exemplary embodiment.

Exemplary embodiments are described in detail below with reference to the attached drawings. In the figures, the same reference numeral indicates the same component.

According to one aspect of an exemplary embodiment, a collision avoidance assistance device may be mounted on a vehicle 10, such as a standard automobile, as schematically shown in FIG. 1A. In a normal mode, a driving system device 28 that generates driving/braking force at the wheels (only a part of the driving system device 28 is shown), a braking system device 40 that generates braking force at the wheels, and a steering system device 30 are mounted on the vehicle 10 that has left and right front wheels 12FL and 12FR and left and right rear wheels 12RL and 12RR. The braking system device 40 operates as follows. At a normal time, the brake pressure in the wheel cylinders 42i (i=FL, FR, RL, RR; this notation will be used in the description below) installed on the wheels, that is, braking force at the wheels, is adjusted by a hydraulic circuit 46 communicated with a master cylinder 45 that is operated when the driver steps on the brake pedal 44. On the other hand, when braking is applied to the vehicle by the collision avoidance assistance device as a collision avoidance assistance, the brake pressure in the wheel cylinders of the wheels is increased based on a command from an electronic control device 60 to generate braking force in the wheels. The braking system device 40 may be a device that pneumatically or electromagnetically applies braking force to the wheels or may be any device used by those skilled in the art. At a normal time, the steering system device may be a power steering device that transmits the rotation of a steering wheel 32, operated by the driver, to the tie-rods 36L and 36R for steering the front wheels 12FL and 12FR while boosting the rotation force by a booster 34. On the other hand, when the vehicle is steered by the collision avoidance assistance device as a collision avoidance assistance, the booster 34 is operated based on a command from the electronic control device 60 for steering the front wheels 12FL and 12FR.

In addition, a camera 70 for capturing the situation in the traveling direction of the vehicle and its surroundings is mounted on the vehicle 10 on which the collision avoidance assistance device is mounted, and the captured image information s1 is sent to the electronic control device 60. The camera 70 may be a video camera usually used in this field. The camera that is employed is configured to capture an image in color in monochrome, to convert the captured image to the signal in a form processable by a computer, and to send the converted signal to the electronic control device 60. In addition, a speaker 74 and lights 72 (the lights may be headlights usually mounted on the vehicle), used to issue a warning w1 by sound and/or light, may be mounted for use in collision avoidance assistance.

The operation of the collision avoidance assistance device described above is performed by the electronic control device 60. The electronic control device 60 may include a standard microcomputer, which includes the CPU, ROM, RAM and input/output port device interconnected by a bidirectional common bus, and the driving circuit. The configuration and the operation of the components of the collision avoidance assistance device, which will be described later, may be implemented by the operation of the electronic control device (computer) 60 under control of the program. In addition to the image information s1 from the camera 70, the electronic control device 60 receives the following for predicting the vehicle's future presence area: the wheel speed values VwFL, VwFR, VwRL, and VwRR from a wheel speed sensor 14 provided to detect the vehicle speed of the vehicle, the yaw rate γ from a yaw rate sensor (gyro sensor, etc.) 62 to measure the yaw angle, and the steering angle δ from the booster 34. Although not shown, the various parameters (for example, longitudinal G sensor values) necessary for various types of control to be performed in the vehicle in this embodiment may be input to the electronic control device 60, and various control commands may be output from the electronic control device 60 to the corresponding devices.

Figure 1B:
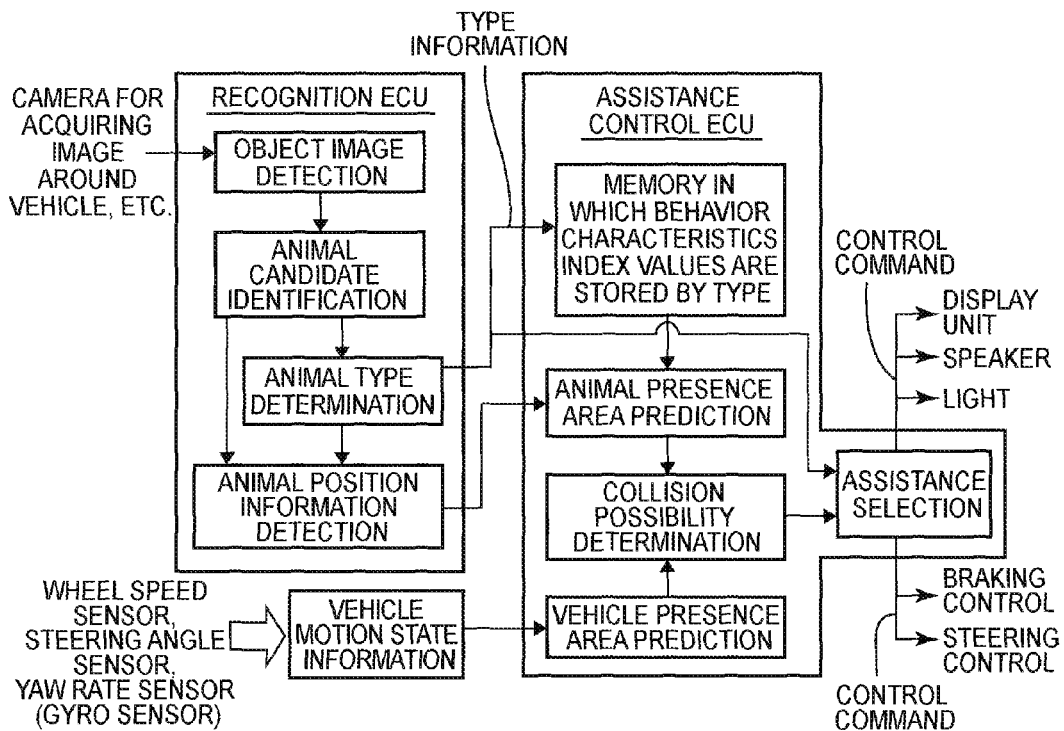
FIG. 1B is a block diagram showing a configuration of the embodiment of the collision avoidance assistance device according to an exemplary embodiment.

Referring to FIG. 1B, the specific configuration of the collision avoidance assistance device implemented by the electronic control device 60 includes a recognition ECU and an assistance control ECU. The recognition ECU includes an object image detection unit that detects the presence of the image of an object (an object such as an animal, a pedestrian, and a vehicle that may collide with the vehicle) in the image of the on-vehicle camera 70; an animal candidate identification unit that identifies whether an object is an animal when the image of the object is detected; an animal type determination unit that determines the type of an animal when the object is an animal; and an animal position information detection unit that detects the position information (position, speed, and direction as viewed from the vehicle) on an animal. On the other hand, the assistance control ECU includes a memory unit that stores in advance the data group of "behavior characteristics index values" that represent the behavior characteristics of animals of the types that are supposed to enter the traveling road of the vehicle; an animal presence area prediction unit that predicts the animal's future presence area using the behavior characteristics index values, which represent the characteristics of the behavior of the determined type of an animal detected in the image in the memory unit, and the position information on an animal; a vehicle presence area prediction unit that predicts the vehicle's future presence area using the motion state information on the vehicle, that is, index values representing the current motion state such as the speed, steering angle, or yaw rate; a collision possibility determination unit that determines whether there is a possibility of collision between the vehicle and an animal using the prediction result of the animal's future presence area and the prediction result of the vehicle's future presence area; and an assistance selection unit that selects an assistance for avoiding collision according to the type of an animal when it is determined that there is a possibility of collision. In providing assistance, the display unit, speaker, or lights are operated according to the mode of the selected assistance, and a control command is sent to a corresponding control device for performing braking control or steering control as necessary. As described above, it should be understood that the configuration and the operation of the units described above are implemented by executing the program in the computer (electronic control device 60). The following describes in detail the processing performed by the recognition ECU for collision avoidance assistance (for recognizing an animal image in the image and for determining an animal type) and the processing performed by the assistance control ECU (for determining whether there is a possibility of collision and for providing assistance for collision avoidance).

The collision avoidance assistance device performs the following as described in Summary. Put shortly, when the image of an animal is detected in an image created by capturing the area in the traveling direction of a traveling vehicle and its surroundings, the collision avoidance assistance device predicts the animal's future presence area and determines whether there is a possibility that the animal will collide with the vehicle and, when there is a possibility of collision, provides a collision avoidance assistance. In such a configuration, because the animal's behavior pattern and the behavior mode depend on the type as described above, it is not known in which direction and at what speed the animal will move if the type is not identified (for example, depending upon the type, the animal may have a strong tendency to move into a direction different from the direction when it was detected). In this case, it becomes difficult to accurately predict the animal's future presence area. To increase accuracy in predicting the animal's future presence area in the situation in which the type is not identified, it is necessary to track the image of the animal in the image for a relatively long time to determine its behavior mode. However, because the movement direction and movement speed of the animal are uncertain, there is a need to search a larger area in the image and, in this case, the calculation load and the processing time are significantly increased. In addition, in providing assistance in collision avoidance, the efficient assistance mode for collision avoidance depends on the type of an animal. For the type of an animal that moves away from the vehicle by simply issuing a warning by sound or light, a warning by sound or light is an efficient assistance. For the type of an animal that does not react to a warning by sound or light but may enter the traveling road of the vehicle, avoiding the animal by braking or steering is an efficient assistance mode.

When the image of an animal is detected, the collision avoidance assistance device first determines the type of the animal as described above and predicts the animal's future presence area, considering the behavior characteristics of the determined type, that is, the probable behavior pattern or the behavior mode, of the animal. In this case, the collision avoidance assistance device references the behavior characteristics of the type of the detected animal to increase accuracy in the prediction result of the detected animal's future presence area. At the same time, as compared to when the direction in which the animal is likely to move and the speed at which the vehicle will move are not known, the collision avoidance assistance device reduces the time for tracking the animal in the image, leading to a reduction in the calculation load and the processing time. In addition, the ability to identify the type of the animal makes it possible to select or determine an efficient mode as a collision avoidance assistance according to the type of the animal, thus providing a suitable collision avoidance assistance. The main configuration of the collision avoidance assistance device is the configuration specifically designed for collision avoidance assistance when the image of an animal is detected in the image. When a non-animal image is detected in the image, the processing for collision avoidance assistance may be performed in some other mode. Therefore, the collision avoidance assistance device may be implemented as a part of a general-purpose collision avoidance assistance device for a vehicle. The following describes each of the processing.

Figure 2A:
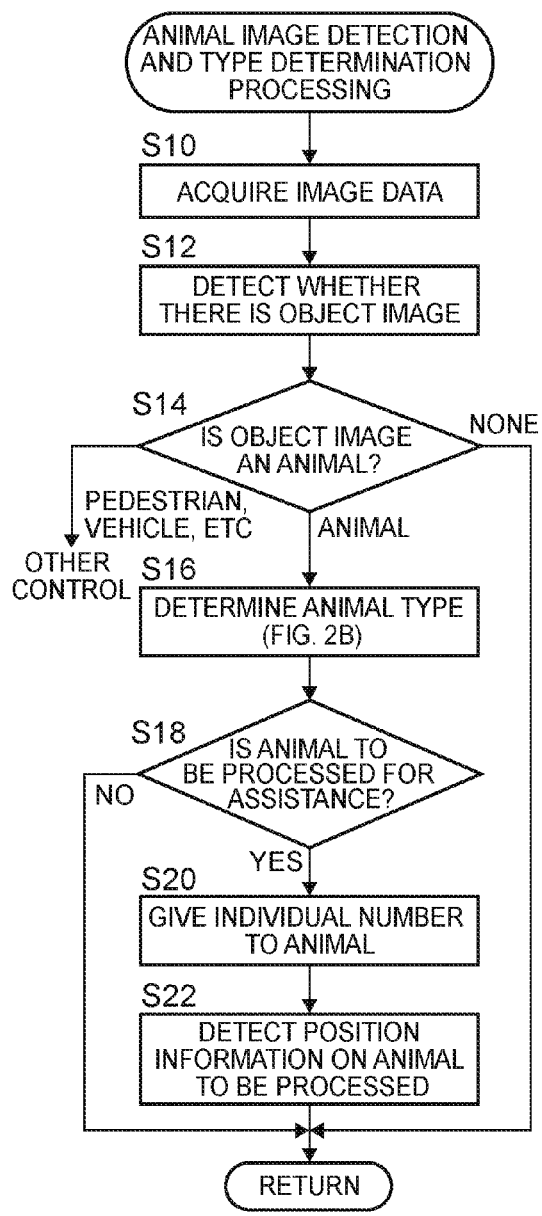
FIG. 2A is a flowchart showing an embodiment of the processing operation in a recognition ECU of the collision avoidance assistance device according to an exemplary embodiment.
Figure 4A:
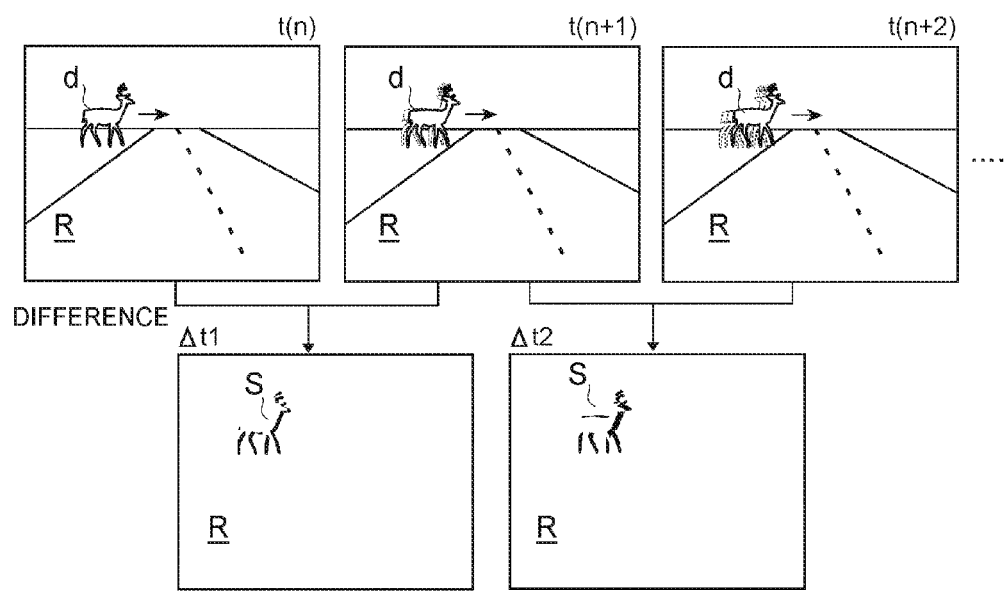
FIG. 4A is a diagram showing the edge extraction processing for detecting the image of an animal in an image captured by an on-vehicle camera.

Referring to FIG. 2A, in the processing of animal image detection and animal type determination performed for the image by the recognition ECU in the device, the recognition ECU first acquires image data captured by the on-vehicle camera 70 (step S10). After that, the recognition ECU detects whether there is the image of an object, such as an animal, a pedestrian, and a vehicle with which the vehicle may collide, in the captured image (step S12). The image captured by the on-vehicle camera 70 may be an image created according to the specification usually used in this field as schematically shown at the top in FIG. 4A. The angle of view of the image is typically adjusted so that the traveling road R and its surroundings ahead of the traveling vehicle are included. The detection processing for the presence of the image of an object may be performed by an arbitrary image processing method. In one mode, as schematically shown at the top in FIG. 4A, the difference in brightness is first calculated for each pixel in the temporarily continuous images. As a result, the difference is essentially zero in the background image or in the image of a stationary object, while a positional discrepancy is generated between continuous images in the image d of a moving object such as an animal and, as shown at the bottom in FIG. 4A, the edge of the image d is generated in the images Δt1 and Δt2, each representing a difference between continuous images, as the difference image S of brightness values. Therefore, by extracting the edge image S that is the difference in brightness values, the presence of the image d of a moving object can be detected. More specifically, in detecting the difference image S of brightness values, that is, in extracting the edge of the image d of a moving object, an area with brightness values exceeding a predetermined threshold is extracted in the difference images Δt1 and Δt2. This allows the edge image S, that is, the presence area of the image d of a moving object, to be detected. In the calculation of differences in continuous images, a background discrepancy generated as the vehicle travels and a noise generated by capturing can be ignored by setting a threshold for extracting the difference image S of brightness values in the difference images Δt1 and Δt2. In addition, the difference image between continuous images may be calculated after correcting a background discrepancy between continuous images using the vehicle speed information.

Figure 4B:
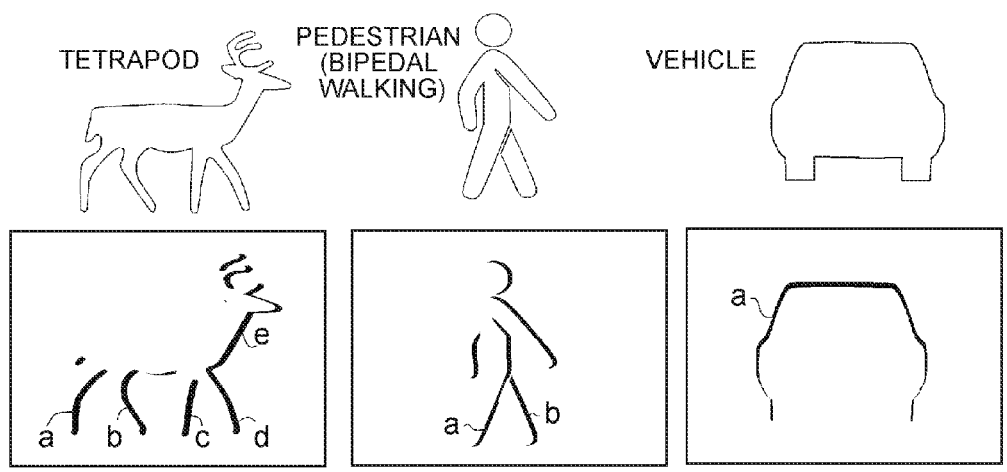
FIG. 4B is a schematic diagram showing the edge images extracted from the images of a tetrapod, a pedestrian (bipedal walking object), and a vehicle in an image.

If the image of an object is detected in the image captured by the camera 70 in this manner, a determination is made whether the image is an animal (step S14). The processing for determining whether the candidate image of the detected object is an animal may be performed by an arbitrary image processing method. In one mode, the determination may be made based on the configuration of the edge image S in the difference images Δt1 and Δt2 described above. More specifically, as schematically shown in FIG. 4B, the edge images a and b representing two legs are detected in the edge image when the object is a pedestrian (bipedal walking object) (figure in the middle), and the edge image 'a' representing the outline is detected when the object is a vehicle (figure on the right). On the other hand, the edge images a, b, c, d, and e of the four legs and the neck are detected when the object is a tetrapod (figure on the left). Therefore, it can be determined whether the image d of the moving object is a tetrapod animal by determining whether there are edge images a, b, c, d, and e of the four legs and the neck in the edge image S of the difference image.

If the image of a moving object is not found in the determination processing described above, the next cycle is started. If the image of the moving object is a pedestrian (bipedal walking object) or a vehicle, other processing may be performed. If the image d of the moving object is a tetrapod, the animal type determination processing (step S16) is performed. Typically, as schematically shown in FIG. 5B, the animal type determination processing may be performed by performing pattern matching for the image, obtained by the on-vehicle camera 70, using the prepared patterns of the images of various animals that are supposed to enter the traveling road of a vehicle. In this case, in order to reduce the number of candidate patterns to be used for matching with the image of an animal in an image, the animal may be classified into one of the sizes, for example, into the large size, medium size, and small size, before performing pattern matching. This allows the pattern, which will be used for matching, to be selected from the patterns of animals having the size determined by the classification.

Figure 2B:
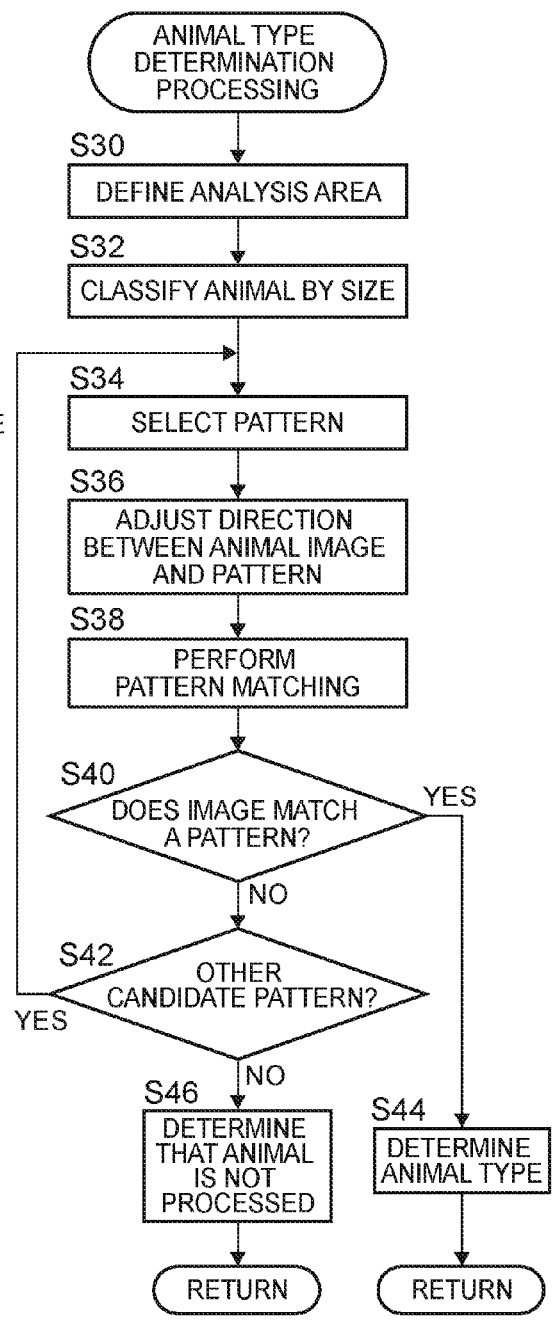
FIG. 2B is a flowchart showing an embodiment of the animal type determination processing in the processing operation in FIG. 2A.
Figure 5A:
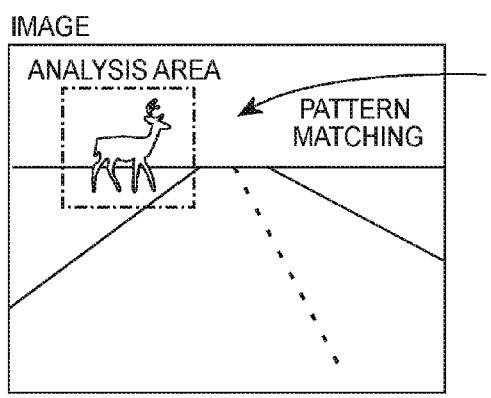
FIG. 5A is a diagram showing the processing for determining the type of an animal by performing pattern matching for the image of an animal detected in an image captured by the on-vehicle camera.
Figure 5B:
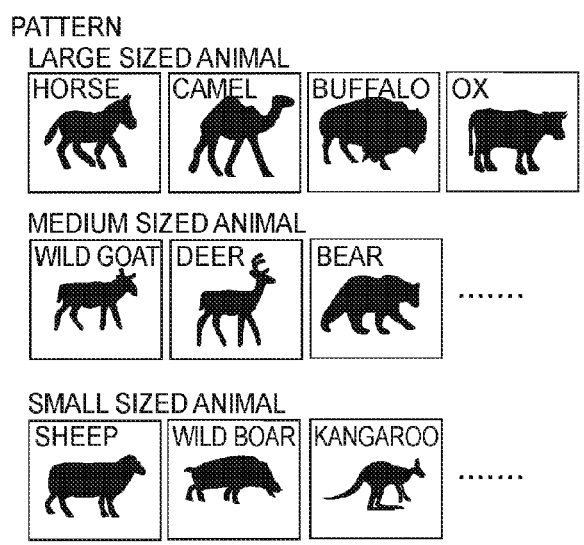
FIG. 5B is a diagram schematically showing an example of the patterns of animal images used for pattern matching.

More specifically, referring to FIG. 2B, the pattern matching analysis area is first defined in the image obtained by the on-vehicle camera 70 as shown in FIG. 5A (step S30). Because the presence area of the image of the object in the above image is already detected, the analysis area may be set based on the presence area. Next, the detected animal is classified by size into one of the sizes as described above according to the animal size estimated from the size of the image of the object (step S32). At this time, because the angle of view of the whole camera image is known and the vehicle is supposed to travel essentially on a plane, the size of the animal in the image can be estimated from the size of the image of the object in the image (angle of view) and its position in the image.

After the animal in the image is classified by size, one of the patterns of the animals corresponding to the size is selected (step S34), the direction is adjusted between the image of the animal in the image and the pattern (step S36) and, then, pattern matching is performed (step S38). For example, in selecting a pattern, if the size of the image of the animal in the image is classified into the medium size, one of the medium-sized animal patterns is selected from the patterns shown in FIG. 5B. In adjusting the direction between the image of the animal and the pattern, because the direction of the animal image is known from the arrangement of the edge image of the neck with respect to the edge image of the legs in the edge image described above, the direction of the selected pattern may be determined so that it is adjusted to the positional relation between the legs and the neck of the animal image. The pattern matching may be performed using an arbitrary image processing method. For example, the cross-correlation function value between the brightness value of the analysis area of the image and that of the pattern is calculated. If the cross-correlation function value is larger than a predetermined value, it may be determined that the animal image matches the pattern. The pattern matching may be performed for the animal image in several images.

In this manner, it is determined in the pattern matching whether the animal image matches the selected pattern (step S40). If it is determined that the animal image matches the pattern, the type of the animal is determined to be the type of the pattern that matches (step S44). On the other hand, if it is determined that the animal image does not match the pattern, one of the other patterns of animals with the size determined by animal image classification is selected (step S42). The same processing as described above is repeated to search for the type of the animal in the image until the matching pattern is found. If the animal image does not match any of the prepared animal patterns, it is determined that an animal not processed by this collision avoidance assistance is found (step S46). In that case, the next cycle is started (step S18). A small-sized animal (dog, cat, etc.), which is a tetrapod but is still smaller than the small-sized animals shown in FIG. 5B, is not processed by collision avoidance assistance. Usually, it is very rare that an animal, which has a size for which collision avoidance assistance is preferably performed but is not anticipated by collision avoidance assistance, enters the traveling road.

Figure 5C:
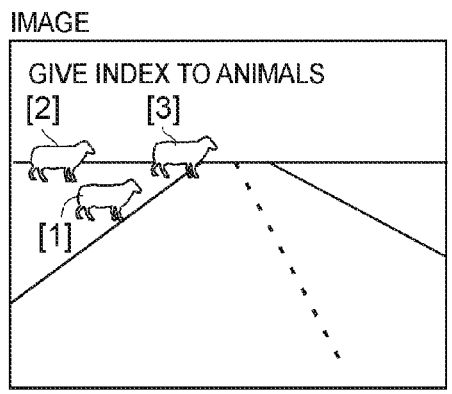
FIG. 5C is a diagram schematically showing the image of animals in an image, captured by the on-vehicle camera, when a plurality of animals forms a group with indexes attached to the individual animals in the figure.

A group of many animals may be detected in the image as schematically shown in FIG. 5C. In that case, the type determination processing similar to that described above may be performed for individual animal images. After determining the types, an individual number is given to each of the animal images as shown in the figure (step S20). When an animal is present as an individual, the individual number may be attached only to that individual.

After the animal type of the animal image included in the image is determined as described above, the position information on the animal, or the position and the speed as viewed from the vehicle, is detected (step S22). As described above, the animal position can be estimated from the position of the image included in the image, and the direction of the animal can be identified from the positional relation between the legs and the neck in the edge image S. The speed of the animal (current speed) can be detected from a change in the positions of the images in several continuous images. The image processing amount is not increased because the speed change tendency need not be detected and the image position is known.

After the image of an animal is detected in the image of the on-vehicle camera 70, the type is determined, and the position information is detected as described above, the information is referenced by the assistance control ECU. Then, as shown in the flowchart in FIG. 3, the following three types of processing are performed: (1) prediction of the animal's future presence area, (2) prediction of vehicle's future presence area, and (3) determination of possibility of collision between the vehicle and the animal.

(1) Prediction of the animal's future presence area: Put shortly, in the prediction of the animal's future presence area, the movement direction and the speed of the animal in the future are estimated based on the current position, speed, and direction of the animal detected in the image of the camera 70 as well as on the "behavior characteristics index values" representing the behavior characteristics of the type of the animal. Based on this estimation, the position or the range in the planar area around the vehicle, where the animal will be present in the future, are predicted. On this point, the prediction result of the animal's future presence area may be represented in various modes. For example, the prediction result may be represented as an animal's movement path from the current animal position to the position at an arbitrary time in the future or as an animal's future presence position or range at an arbitrary time in the future.

In general, for the future behavior of an animal, each of the various behavior patterns may be generated with the generation probability of each pattern corresponding to the behavior characteristics of the animal type. This means that the animal will be present at various positions or in various ranges in the planar area around the vehicle based on the generation probability of each of these various behavior patterns. For example, because an animal is considered to move into a certain direction and at a certain speed with a certain probability, the probability with which the animal will be present at a certain position at a certain time can be calculated using the probability, direction, and speed. After that, by collecting the probabilities at various positions (not necessarily the whole area) within the planar area around the vehicle, the distribution of the animal's future presence probabilities in the planar area around the vehicle can be determined. Therefore, to predict the animal's future presence area, the animal's future presence position in the planar area around the vehicle and the presence probability at that position are calculated, or its distribution is generated, in this embodiment using the current position, speed, and direction of the animal, the direction and speed in various possible behavior patterns, and the generation probability of each behavior pattern. More specifically, in this processing, the animal's future position in the planar area around the vehicle and the probability with which the animal will be present at that position are calculated, or the distribution of the presence probabilities of the animal in the planar area around the vehicle is calculated, for each point in time using the animal's movement model in which the mode of movement from the animal's detected position is assumed. The following describes an animal's movement model assumed in this embodiment, the calculation of the animal's future presence position in the planar area around the vehicle and its probability based on the model, and the generation of its distribution.

Figure 6A:
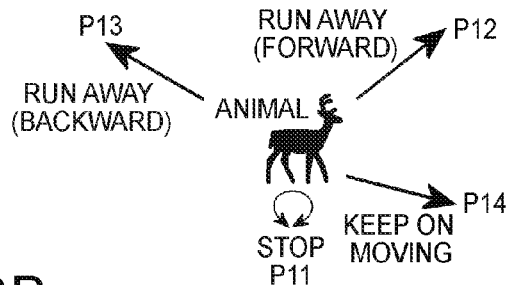
FIG. 6A is a diagram showing the behavior patterns, which are used to predict an animal's future presence area and are selected by an animal in the animal movement model, as well as their generation probabilities, according to an exemplary embodiment.
Figure 6B:
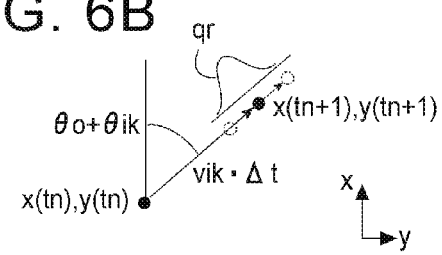
FIG. 6B is a diagram showing the movement distance per unit time, and the direction, of an animal position in an animal movement model.

(i) Animal's movement model: First, as schematically shown in FIG. 6A, it is assumed in the animal's movement model that, when the vehicle approaches an animal, the animal of a certain type selects one of the behavior patterns—stop, run away forward, run away backward, keep on moving (without approaching the vehicle)—with the generation probability of "Pik". "i" is the symbol representing an animal type (for example, horse, ox, sheep, deer, wild goat, bear, kangaroo, etc.), and "k" is the symbol representing a behavior pattern (for example, stop, run away forward, run away backward, keep on moving (without approaching the vehicle)). When the behavior pattern k is selected, the animal is assumed to move according to the recurrence formula given below as schematically shown in FIG. 6B:

$$x_{ik}(t_{n+1})=x_{ik}(t_n)\cdot\cos(\theta o+\theta_{ik})\cdot\Delta t \quad (1)$$

$$y_{ik}(t_{n+1})=y_{ik}(t_n)+v_{ik}(t_{n+1})\cdot\sin(\theta o+\theta_{ik})\cdot\Delta t \quad (2)$$

where $x_{ik}(t_n)$, $y_{ik}(t_n)$, and $v_{ik}(t_n)$ are the presence position at the time to when the animal i selects the behavior pattern k (coordinate values in the coordinate system with the current vehicle position as the origin and with the vehicle traveling direction in the x direction) and the speed. The initial values of $x_{ik}$, $y_{ik}$, and $v_{ik}$ in the recurrence formula given above are the current animal position (x(0), y(0)) in the image and the speed v(0) in the animal's direction θo in the image, respectively. Therefore, as shown in FIG. 6B, the animal is assumed to serially move from the position, where the animal is detected in the image, into the direction of the angle $\theta o+\theta_{ik}$ viewed from the traveling direction of the vehicle, $v_{ik}\Delta t$ per unit time $\Delta t$ [$t_{n+1}$ to $t_n$].

Figure 6C:
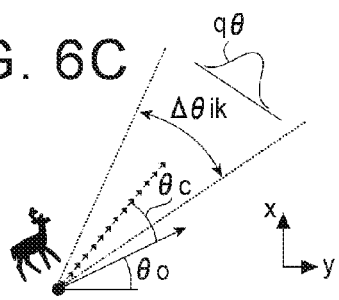
FIG. 6C is a diagram showing the movement direction of an animal in an animal movement model.
Figure 6F:
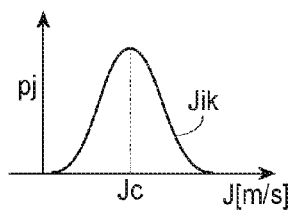
FIG. 6F is a graph diagram schematically showing the distribution of generation probabilities $pj$ of the speed jerk J that is given as one of the behavior characteristics index values of an animal in an animal movement model.
Figure 6D:
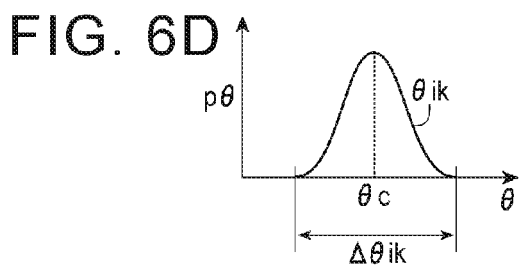
FIG. 6D is a graph diagram schematically showing the distribution of generation probabilities $p\theta$ of the movement direction $\theta ik$ of the angle width $\Delta\theta ik$ that is given as one of the behavior characteristics index values of an animal in an animal movement model.
Figure 6G:
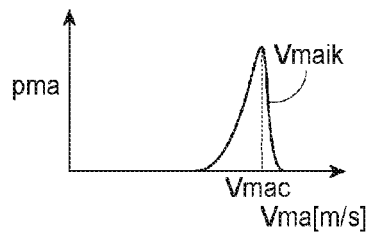
FIG. 6G is a graph diagram schematically showing the distribution of generation probabilities $pma$ of the animal's maximum possible speed Vmax that is given as one of the behavior characteristics index values of an animal in an animal movement model.
Figure 6E:
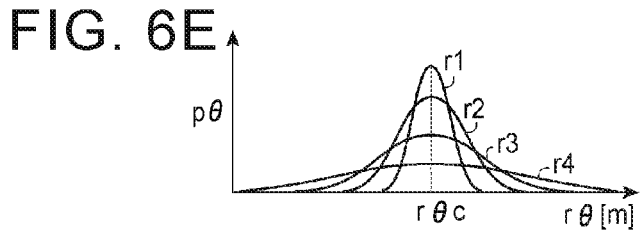
FIG. 6E is a graph diagram represented by converting the distribution of generation probabilities $p\theta$ of the movement direction $\theta ik$ of the angle width $\Delta\theta ik$, shown in FIG. 6D, into the distance in the direction of an arc with the radius of r.

In the model given above, the movement direction $\theta o+\theta_{ik}$ at an animal movement time is assumed, in more detail, to be the direction determined by displacing the animal's direction θo in the image by $\theta_{ik}$ when the behavior pattern k is selected, as schematically shown in FIG. 6C. The value of $\theta_{ik}$ is assumed to be a value in the range in the angle width of $\Delta\theta_{ik}$, such as that shown in FIG. 6C, with the generation probability pθ that follows the distribution (central value θc) of the hanging-bell-shaped profile such as that schematically shown in FIG. 6D. The width of the probability distribution differs according to the animal type and the behavior pattern. Therefore, as schematically shown in FIG. 6C, the presence positions in the animal's angle direction are distributed according to the distribution of the presence probabilities qθ based on the generation probability pθ. To make the model simpler, the value of the animal's movement direction $\theta o+\theta_{ik}$, which is determined first, may be maintained unchanged. In addition, the actual distance width (length of the arc) corresponding to the angle width $\Delta\theta_{ik}$ becomes longer as the movement distance of the animal becomes longer. Therefore, when the distance is converted to the actual distance, the generation probability pθ becomes lower as the distance from the animal's current position becomes larger (r1→r2→r3→r4) (integration value is constant) as schematically shown in FIG. 6E. That is, the longer the movement distance of the animal is, the lower the presence probability at each position is.

In addition, it is assumed in the model given above that the speed of the animal follows the following recurrence formula:

$$v_{ik}(t_{n+1})=\min\{v_{ik}(t_n)+J_{ik}, Vmaik\} \quad (3)$$

where Jik and Vmaik are the per-unit-time change in the movement speed (speed jerk) of the animal and the maximum speed, respectively, when the animal i selects the action pattern k. Therefore, the recurrence formula above indicates that the movement speed of the animal changes by the speed jerk Jik per unit time. However, when the $v_{ik}(t_n)+J_{ik}$ is higher than the maximum speed Vmaik, it is assumed that the movement speed is the maximum speed Vmaik or that the movement speed does not exceed the practical value. In more detail, the value of the speed jerk Jik is assumed to be a value determined according to the generation probability pj that follows the distribution (central value Jc) of the hanging-bell-shaped profile such as that schematically shown in FIG. 6F. The width of the probability distribution differs according to the animal type and the behavior pattern. Similarly, the value of the maximum speed Vmaik may be assumed to be a value determined according to the generation probability pMa that follows the distribution of the hanging-bell-shaped profile such as that schematically shown in FIG. 6G. The distribution in which the central value Vmac that gives the maximum probability value is shifted to the higher-speed side. The width of the probability distribution differs according to the animal type and the behavior pattern. That is, the value of the speed $v_{ik}(t)$ of the animal is assumed to be a value generated with the generation probability pj or pMa. Therefore, referring to FIG. 6B again, the positions after the animal moves per unit time are distributed according to the presence probability qr based on the generation probability pj or pMa over some range (range indicated by white circles in the figure) before and after the filled circle corresponding to the central value Jc or Vmac.

Figure 6H:
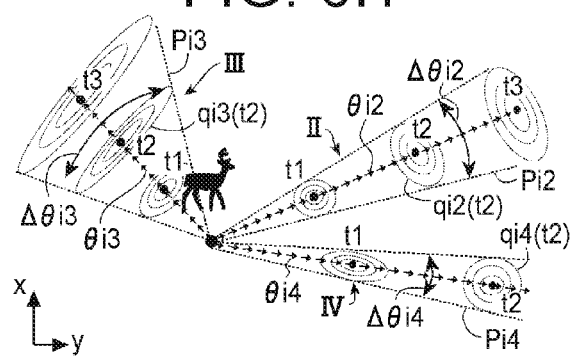
FIG. 6H is a diagram schematically showing the distribution of animal's future presence positions that is obtained according to an animal movement model.

FIG. 6H is a diagram schematically showing an example of the movement of the animal position in the planar area around the vehicle as well as the probabilities when the animal i is assumed to move according to the model represented by the recurrence formulas (1) to (3). Referring to the figure, in the model given above, the animal is predicted to move to one of the fan-shaped areas, indicated by II, III, and IV in the figure, corresponding to each of a plurality of possible behavior patterns with the generation probability of Pi2, Pi3, and Pi4 respectively. In more detail, the calculation of the position and the speed of the animal i is repeated according to the recurrence formulas (1) to (3) using (Ji2, Vmai2, θi2), (Ji3, Vmai3, θi3), and (Ji4, Vmai4, θi4) having the generation probability distribution, shown in FIG. 6D, FIG. 6E, FIG. 6F, and FIG. 6G, in each of the fan-shaped areas II, III, and IV. For example, at the time t1 in the figure, the animal positions are distributed from the position (filled circle), calculated using the central values Jc, Vmac, and θc (highest generation probability values) of the (Jik, Vmaik, θik), to the periphery with the decreasing probabilities qi2(t), qi3(t), and qi4(t) (in the figure, the dotted line circles around the filled circle are the contours of the probability). As the time elapses t1→t2→t3, it is expected that the distribution of the presence positions will move.

In the model described above, the four parameters (Jik, Vmaik, θik, Pik) are the behavior characteristic index values representing the characteristics of the animal behavior. Because a set of values, which differs according to the animal type, is used for the behavior characteristic index values (Jik, Vmaik, θik, Pik), the distribution of animal presence positions and mode of change over time differ according to the animal type (see FIG. 10). Because the size of the area in which the animal will be present is usually increased over time as shown in the figure, the presence probability at each of the positions is decreased.

Figure 7A:
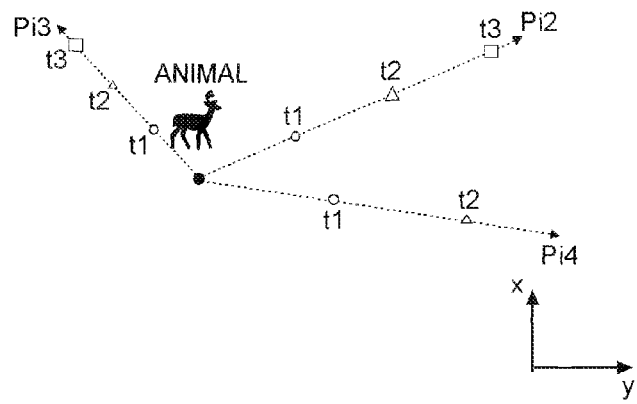
FIG. 7A is a diagram schematically showing a change in the highest presence probability position over time for each behavior pattern, using an animal movement model used for predicting the animal's future presence area(first mode) according to an exemplary embodiment.

(ii) Calculation of animal's future presence probability and generation of its distribution: According to the animal movement model given above, the animal's future presence probability at a certain position at a certain time is given by Pik×pθ(θik)×pj(Jik) (or×pma(Vmaik)). However, the analytical calculation of the presence probability at each position in the whole planar area around the vehicle is difficult because the calculation requires a huge amount of calculation. To address this problem, the first mode of the prediction result is that, as the representative values of the animal's future position and the probability with which the animal will be present at that position, the highest presence probability position and the presence probability at that position may be calculated by means of the recurrence formulas (1) to (3) given above using the central values Jc, Vmac and θc of (Jik, Vmaik, θik) for each behavior pattern. As schematically shown in FIG. 7A, the presence position is calculated by serially performing calculation using the recurrence formulas for each point in time (t1, t2, t3, . . . ), and the presence probability at each presence position is given by Pik×pθ(θik=θc)×pj(Jik=Jc) (or×pma(Vmaik=Vma)). In this case, in the calculation result, the animal's future presence position moves along the line, created by joining the filled circles in FIG. 6H, as the time elapses. As described above, because pθ is reduced as the distance from the first position becomes longer as the time elapses, the presence probability at each presence position is reduced.

Figure 7B:
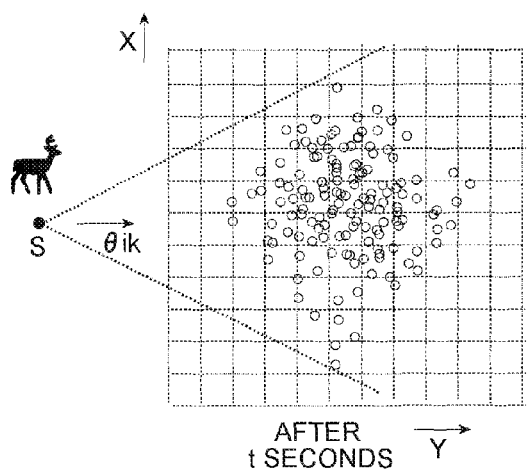
FIG. 7B is a diagram schematically showing an example of the distribution of plots of animal's future predicted positions in the planar area around the vehicle at a certain time t that is calculated according to an animal's movement model in which random numbers are used as behavior characteristics index values (second mode)
Figure 7C:
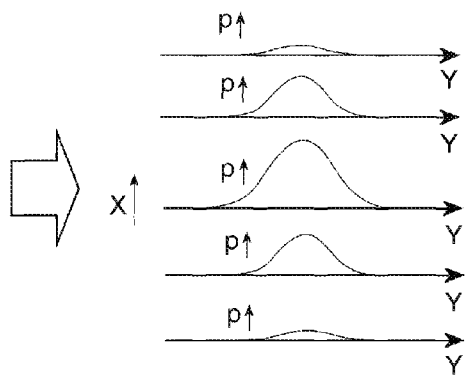
FIG. 7C is a diagram schematically showing the distribution of future presence probabilities p calculated from the plots of the predicted positions shown in FIG. 7B.
Figure 7D:
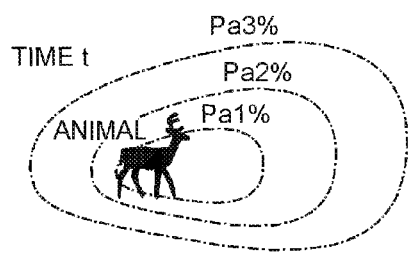
FIG. 7D is a diagram schematically showing the distribution of animal's future presence probabilities Pa at a certain time t.
Figure 7E:
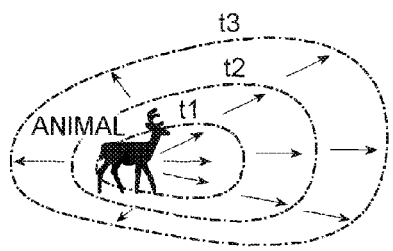
FIG. 7E is a diagram schematically showing a change over time in the distribution of animal's future presence probabilities (the dashed line indicates the contour line of the probability)

In another mode of the prediction result (second mode), random numbers according to the generation probability of each of (Jik, Vmaik, θik) are substituted in the above-described recurrence formulas (1) to (3) to calculate many future presence positions of the animal at each point in time and, after that, the distribution of presence probabilities, obtained by collecting the animal presence frequencies in the planar area around the vehicle, may be generated as the prediction result. More specifically, as the values of (Jik, Vmaik, θik), random numbers are first generated according to each generation probability as described above and, then, the generated random numbers are substituted in the recurrence formulas (1) to (3) given above to calculate the animal's future presence positions at each point in time. By doing so, many presence positions of the animal at a certain time t in the planar area around the vehicle can be plotted as schematically shown in FIG. 7B. Therefore, the presence frequency (number of plots) can be calculated for each small area obtained by partitioning the planar area around the vehicle into areas each with a predetermined width. After that, by dividing the presence frequencies in each small area by the total number of presence frequencies, the presence probability p in each small area is calculated as schematically shown in FIG. 7C. In addition, by multiplying the presence probability by the probability with which (Jik, Vmaik, θik) is selected, that is, by the generation probability Pik of the behavior pattern k, the animal's presence probability distribution at the time t is generated. In this case, the animal's presence probability for each small area of the planar area around the vehicle is given and, as schematically shown in FIG. 7D, the distribution of future presence probabilities at each point in time is generated around the animal (in the figure, the dashed line is the contour line of the presence probability). In addition, by generating the distribution of the future presence probabilities on a time-series basis, the change in the distribution of the future presence probability over time can be predicted as shown in FIG. 7E (The dashed line is the contour line of a certain probability).

(iii) Processing process: Referring again to the flowchart in FIG. 3, the actual processing is described. First, according to the determined animal type, the behavior characteristics index values (Jik, Vmaik, θik, Pik) described above are selected from the data group of behavior characteristics index values that is stored in the memory unit in advance and that represents the behavior characteristics of animal types supposed to enter the traveling road of the vehicle (FIG. 3—step S50). FIG. 8 shows, in a tabular form, the data group of the speed jerk, maximum speed, angular displacement, and generation probability saved in the memory unit. As understood from the figure, the data group of behavior characteristics index values includes data on the speed jerk Jik, maximum speed Vmaik, angular displacement θik, and generation probability Pik for each possible behavior mode for each of various animal types. When the type of an animal detected in the image is identified, all of the set of behavior characteristics index values of the type is selected. For example, if the animal type is a deer, all of the data group of a deer is selected. On this point, in the configuration in which the highest presence probability position and the presence probability at that position are calculated at each point in time as the prediction result (first mode), the central value of each of the speed jerk Jik, maximum speed Vmaik, and angular displacement θik is selected. Therefore, in the configuration in which only the prediction in the first mode is performed, the data group saved in the memory unit is required only to include the central values of these parameters. In the configuration in which the distribution of presence probabilities at each point in time is generated (second mode), random number values, given according to each generation probability, are selected for the speed jerk Jik, maximum speed Vmaik, and angular displacement θik. The data group of the speed jerk, maximum speed, angular displacement, and generation probability, saved in the memory unit, may be data collected in advance by the observation test of various animals.

After that, for each of the selected behavior patterns, the highest presence probability position and the presence probability at that position at each point in time are calculated using the recurrence formulas (1) to (3) given above (first mode) or the presence probability distribution at each point in time is generated (second mode) (step S52). Which prediction result is to be calculated or generated, either in the first mode or in the second mode, may be suitably selected by the designer of the device. The collision possibility determination processing, which will be described later, differs according to which mode is selected. The time range of prediction (last time of day at which prediction is performed) may be set appropriately.

When a plurality of animals is detected around the vehicle as shown in FIG. 5C, the prediction result in the first or second mode may be calculated or generated separately for each animal. In that case, because an index is given to each of the plurality of animals as described above, the highest presence probability position and the presence probability at that position at each point in time are calculated (first mode), or the presence probability distribution at each point in time is generated (second mode), for each index. On this point, for some type of animal, the behavior pattern or the behavior characteristics may differ between the time when the animal behaves as an individual and the time when the animal belongs to a group (see FIG. 10D and FIG. 10E). Therefore, when animals form a group when calculating the animal's future presence probability using the recurrence formulas (1) to (3) given above or generating its distribution, the values for each animal type, which are used when animals form a group, are selected for the set of behavior characteristics index values as shown at the bottom of FIG. 8.

(2) Prediction of vehicle's future presence area: After the animal's future presence area is predicted in this manner, the vehicle's future presence area is predicted (FIG. 3—step S54). Typically, the vehicle's future presence position may be estimated appropriately using the index values representing the motion state of the vehicle such as the current vehicle speed, acceleration, steering angle, or yaw rate of the vehicle. Most simply, the prediction result may be calculated from the index values in which the vehicle position or trajectory at each point in time represents the vehicle's motion state. However, because the driver may perform the acceleration/deceleration operation or the steering operation in practice, the vehicle's future presence position and its presence probability may be calculated or its distribution may be generated using the following recurrence formulas (4) to (6) similar to the recurrent formulas (1) to (3) described above:

$$Xv(t_{n+1})=Xv(t_n)+Vv(t_{n+1})\cdot\cos\theta v\cdot\Delta t \quad (4)$$

$$Yv(t_{n+1})=Yv(t_n)Vv(t_{n+1})\cdot\sin\theta v\cdot\Delta t \quad (5)$$

$$Vv(t_{n+1})=\min\{Vv(t_n)+Jv, Vmav\} \quad (6)$$

where $Xv(t_n)$, $Yv(t_n)$, and $Vv(t_n)$ are the vehicle presence position at the time to (coordinate values in the coordinate system with the current vehicle position as the origin and with the vehicle traveling direction in the x direction) and the speed, respectively. $\theta v$ is the future traveling direction of the vehicle, and its value may be assumed to be generated with the vehicle's traveling direction, calculated from the current steering angle, as the central value and with the generation probability based on the hanging-bell-shaped distribution shown in FIG. 6D. The distribution width is different from that of an animal. The speed jerk Jv is the change in speed when acceleration/deceleration control is performed by the driver (or a driving control system), and its value may be assumed to be generated with the generation probability based on the hanging-bell-shaped distribution shown in FIG. 6F wherein the per-unit-time speed increase, which is calculated from the current acceleration/deceleration value, is the central value. Vmav is the maximum speed of the vehicle.

Figure 9A:
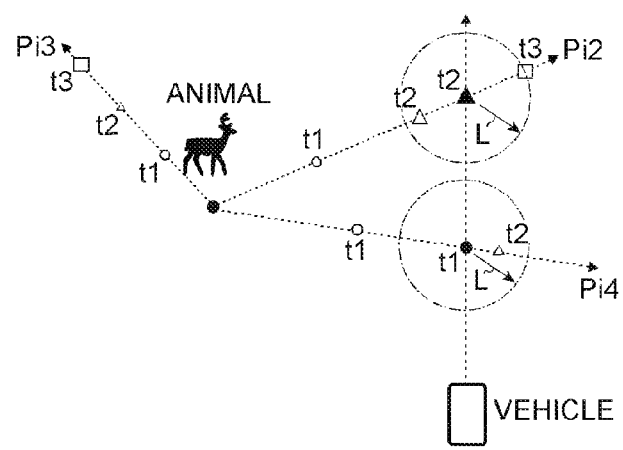
FIG. 9A is a diagram showing the processing for determining the possibility of collision between a vehicle and an animal in the mode (first mode) in which the highest presence probability position is estimated at each point in time for each behavior pattern as the prediction of the animal's future presence area.
Figure 9B:
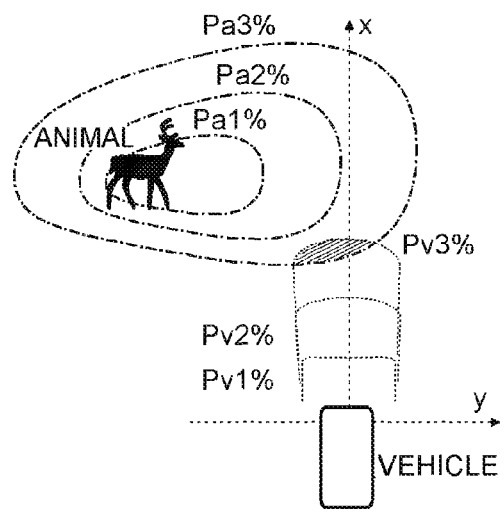
FIG. 9B is a diagram showing the processing for determining the possibility of collision between a vehicle and an animal in the mode (second mode) in which the animal's presence probability distribution in the area around the vehicle is generated as the prediction of the animal's future presence area.
Figure 9C:
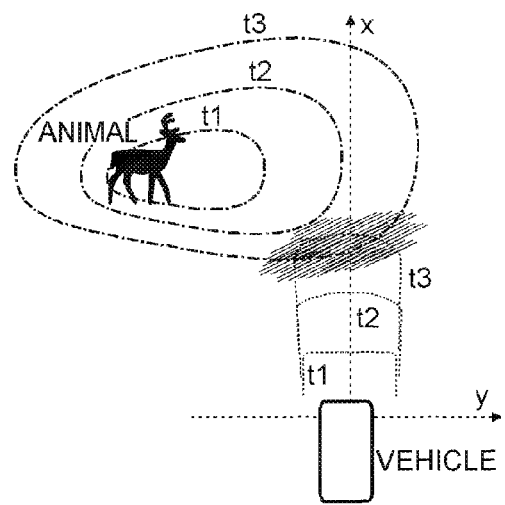
FIG. 9C is a diagram schematically showing that the distribution of animal's future presence probabilities overlaps with the area of the vehicle's future high-probability presence while the distribution of animal's future presence probability changes over time.

In the first mode, the prediction result of the vehicle's future presence area is obtained in the same manner as for an animal and as schematically shown in FIG. 9A. That is, as the representative values of the vehicle's future position and the probability with which the vehicle will be present at that position, the highest presence probability position and the presence probability at that position may be calculated by means of the recurrence formulas (4) to (6) given above using the central values of Jv and $\theta v$ at each point of times (t1, t2, . . . ). In the second mode, as in the case of the animal, random numbers according to each generation probability are generated as Jv and $\theta v$, and the generated random numbers are substituted in the recurrence formulas (4) to (6) to calculate the vehicle's future presence at each point in time. After that, the presence frequency (number of plots) in each small area, obtained by partitioning the planar area around the vehicle into areas with a predetermined width, is calculated, the presence probability p of each small area is calculated and, as shown in FIG. 9B, the distribution of the future presence probabilities (Pv1, Pv2, . . . ) is generated for each point in time. As a result, the change in the distribution of future presence probabilities (t1, t2, t3, . . . ) is obtained as shown in FIG. 9C. The time range of prediction (last time of day at which prediction is performed) may be set appropriately.

(3) Determination of possibility of collision between the vehicle and the animal: After the future presence areas of the animal and the vehicle are predicted in this manner, these prediction results are used to determine whether there is a possibility of collision that the animal will collide with the vehicle (FIG. 3—step S56).

If the prediction results of the future presence areas of the animal and the vehicle are obtained in the first mode, that is, if the highest presence probability position of each of the animal and the vehicle at each point in time and its presence probability at that position are calculated, it is determined at each point in time whether the animal's predicted presence position (highest presence probability position in each behavior pattern) and the vehicle's predicted presence position (highest presence probability position) are in the range of a predetermined distance L, as schematically shown in FIG. 9A. If the animal's predicted presence position and the vehicle's predicted presence position are present in the range of the predetermined distance L, the collision possibility probability Pc is calculated using the presence probability Pa of the animal's predicted presence position and the presence probability Pv of the vehicle's predicted presence position. Pc=Pa×Pv . . . (7). If the collision possibility probability Pc is higher than the predetermined value Pco, that is, if Pc>Pco . . . (8) is satisfied, it may be determined that there is a possibility of collision between the animal and the vehicle considering that there is a high probability that both the animal and the vehicle are present at the same time. The predetermined distance L and the predetermined value Pco may be appropriately set on an experimental or theoretical basis. In the example in FIG. 9A, it is determined that there is no possibility of collision at the time t1 because the animal's predicted presence position is not present within the circle of the radius L at the vehicle's predicted presence position. On the other hand, because the animal's predicted presence position is present within the circle of the radius L at the vehicle's predicted presence position at the time t2, the collision possibility probability Pc is calculated by formula (7) by referencing the presence probabilities Pa and Pv at the respective positions. If formula (8) is satisfied, it is determined that there is a collision possibility. As understood from description of the method for determining the presence probability described above, the longer the distance between the current position and the predicted presence position is, the lower the presence probabilities Pa and Pv are. Therefore, when the animal's predicted presence position is near to the current position and is present within the circle of the radius L at the vehicle's predicted presence position, it is easily determined that there is a collision possibility. On the other hand, when the animal's predicted presence position is distant from the current position and is present within the circle of the radius L at the vehicle's predicted presence position, it is not easily determined that there is a collision possibility.

If the prediction results of the future presence areas of the animal and the vehicle are obtained in the second mode, that is, if the distributions of the presence probabilities of the animal and the vehicle at each point in time, that is, the presence probabilities $pa(x, y)$ and $pv(x, y)$ in each small area, created by partitioning the planar area around the vehicle into areas each with a predetermined width, are obtained, the probability pc, with which both the animal and the vehicle are present, is calculated for each small area at each point in time by performing the multiplication between the animal's presence probability $pa(x, y)$ and the vehicle's presence probability $pv(x, y)$, that is, the formula $pc(x, y)=pa(x, y) \times pv(x, y) \ldots$ (9), is calculated. In addition, the collision possibility probability Pc is calculated by calculating the integrated value of the probability pc with which both the animal and the vehicle are present in each small area, that is, the formula $Pc=\Sigma pc(x, y) \ldots$ (10), is calculated. After that, as in the formula (8) given above, if the collision possibility probability Pc is higher than the predetermined value Pco, it may be determined that there is a collision probability. This calculation may be performed only in the area in which the presence probability values of both the animal and the vehicle are significant. Performing the calculation in this manner limits the analysis-required areas and greatly reduces the amount of calculation as compared when the whole area is analyzed. FIG. 9B and FIG. 9C are diagrams schematically showing examples of the presence probability distribution between the animal and the vehicle at each point in time obtained according to the second mode. First, referring to FIG. 9B, the collision possibility probability Pc at a certain time t is substantially the integrated value of the multiplication value between the animal's presence probability $pa(x, y)$ and the vehicle's presence probability $pv(x, y)$ in the part (shaded area) where animal's presence probability and the vehicle's presence probability are significant values. In this case, if the collision possibility probability Pc in the shaded area is not higher than the predetermined value Pco at a certain time t, it is determined that there is no collision possibility at the time t. However, if the part (dashed line) where the animal's presence probability and the vehicle's presence probability are high are each shifted outward as shown in FIG. 9C and if the collision possibility probability Pc, calculated by the formulas (9) and (10) given above, becomes higher than the predetermined value Pco, for example, at the time t3, it is determined that there is a collision possibility.

Figure 10A:
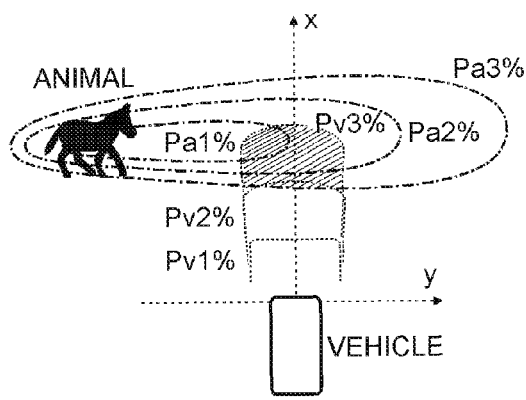
FIG. 10A is a diagram, similar to the diagram in FIG. 9B, schematically showing an example in which the distribution of animal's future presence probabilities differs according to the type of an animal.
Figure 10B:
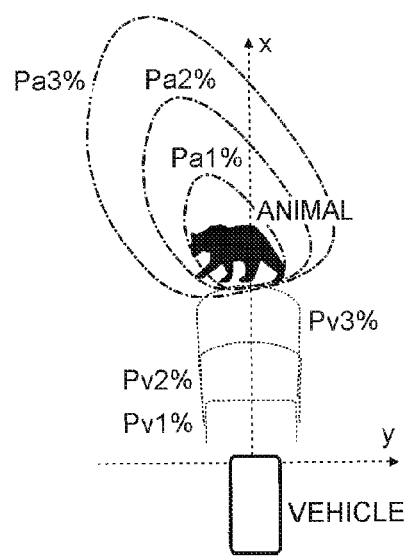
FIG. 10B is a diagram, similar to the diagram in FIG. 9B, schematically showing an example in which the distribution of animal's future presence probabilities differs according to the type of an animal.
Figure 10C:
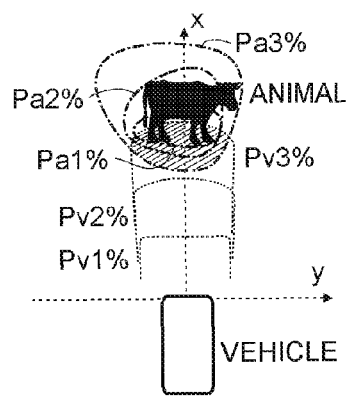
FIG. 10C is a diagram, similar to the diagram in FIG. 9B, schematically showing an example in which the distribution of animal's future presence probabilities differs according to the type of an animal.
Figure 10D:
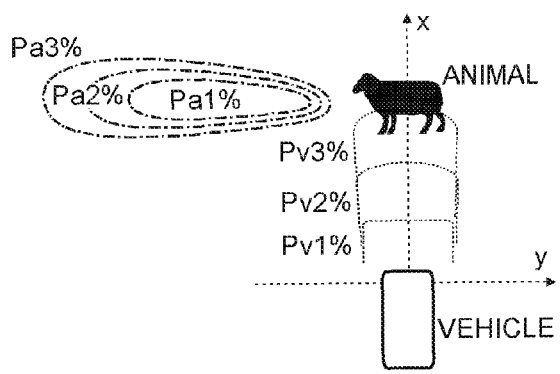
FIG. 10D is a diagram, similar to the diagram in FIG. 9B, schematically showing the case in which an animal of a particular type exists as an individual.
Figure 10E:
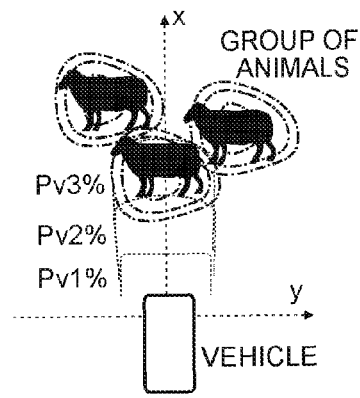
FIG. 10E is a diagram, similar to the diagram in FIG. 9B, schematically showing the case in which animals of the same type exist as a group.

In the above configuration, because the behavior characteristics index values, which are different according to the animal type, are used in predicting the animal's future presence areas as described above, the animal's future predicted presence areas (presence probability distribution), which are different according to the animal type, are obtained as schematically shown in FIG. 10A, FIG. 10B, FIG. 10C, and FIG. 10D. This makes it possible to predict whether there is an area where the probability with which the animal and the vehicle are present at the same time is high, the size of the area where the probability is high, and the time according to the animal type, thus allowing the collision possibility to be determined more accurately than before. In addition, in the configuration described above, different behavior characteristics index values are used as described above according to whether the animal behaves as an individual or belongs to a group. Based on these behavior characteristics index values, whether there is an area where the probability with which the animal and the vehicle are present at the same time is high, the size of the area where the probability is high, and the time are predicted according to whether the animal is an individual or belongs to a group. This makes it possible to predict more accurately the animal's future presence area for an animal type, whose behavior characteristics differ according to whether the animal behaves as an individual or belongs to a group, according to its situation as schematically shown in FIGS. 10D and 10E, thus allowing the collision possibility to be determined more accurately. For example, in the case of an animal of the type that quickly moves away when the animal is present as an individual but does not rarely move when the animal belongs to a group as shown in the examples in FIG. 10D and FIG. 10E, the animal's future presence area is predicted considering such behavior characteristics. Therefore, even for an animal of the same type, the determination result of whether there is a collision possibility may differ according to whether the animal behaves as an individual or belongs to a group.

If it is determined by a series of processing described above that there is no collision possibility over the entire time range from the current time to the time the prediction is made, it is determined that there is no collision possibility (step S58). On the other hand, if it is determined by the series of processing that there is a collision possibility at a time in the time range from the current time to the time the prediction is made, one of the collision avoidance assistances, which will be described below, is performed (step S58).

If the series of processing determines that there is a collision possibility that the animal detected in the image will collide with the vehicle, the collision avoidance assistance, which will be described below, is performed. In that case, because the mode of efficient assistance differs according to the animal type, the assistance mode to be performed is selected according to the type of the detected animal (FIG. 3—step 60). The actual operation of assistance that will be performed may include the following: (i) warning generation (by sound/light) (ii) vehicle braking for decelerating or stopping the vehicle and (iii) vehicle steering for avoiding an animal. In selecting the assistance mode, the mode of a combination of these operations may be selected according to the animal type.

More specifically, any of the following assistance modes may be selected. (a) When the animal is a large animal and the movement speed is slow or stationary: (i) warning generation—generate a warning (ii) vehicle braking—apply maximum braking force (iii) vehicle steering—perform vehicle steering (b) When the animal is a large animal and the moving speed is fast: (i) warning generation—generate a warning (ii) vehicle braking—apply medium braking force (iii) vehicle steering—do not perform vehicle steering (c) When the animal is a small animal that runs away from the vehicle: (i) warning generation—generate a warning (ii) vehicle braking—apply low braking force (iii) vehicle steering—do not perform vehicle steering. The magnitude of "medium" or "low" braking force for vehicle braking described above may be set appropriately on an experimental basis. Other combinations of assistance operations in the above examples may also be used considering the animal behavior characteristics and, in that case, it should be understood that those combinations be included in the scope of the exemplary embodiments.

When the assistance mode according to the animal type is selected in this manner, the assistance in the selected mode is performed (step S62).

Although the above description relates to one or more exemplary embodiments, it is to be understood that many modifications and changes may easily be added by those skilled in the art and that the not limited only to the embodiments above.

For example, the animal's future presence area may be predicted using any of the other methods by which the behavior characteristics according to the animal type are reflected. The representation mode of the prediction result may also be a mode other than that described in the embodiment. The important point is that the animal type is determined, the animal behavior characteristics of the determined type are referenced, and the future movement of the animal around the vehicle is predicted for each animal type and that, by doing so, the animal's presence area or the highly probable area can be estimated accurately. The mode of collision avoidance assistance may be a mode other than those shown in the examples. The important point is that, by determining the animal type, accurate collision avoidance assistance can be provided according to the type

What is claimed is:

1. A collision avoidance assistance device for a vehicle comprising:
    a camera configured to acquire an image of an area around the vehicle; and
    a controller configured to:
    detect an image of a tetrapod in the image of the area around the vehicle;
    determine a species of the animal tetrapod detected in the image;
    retrieve behavior characteristics index values representing behavior characteristics of the determined species of the tetrapod;
    calculate a future presence area of the tetrapod based on the behavior characteristics index values;
    determine a probability of a collision between the tetrapod and the vehicle based on the calculated future presence area of the tetrapod; and
    perform a collision avoidance assistance function based on the determined probability of the collision between the tetrapod and the vehicle.

2. The collision avoidance assistance device for the vehicle according to claim 1, wherein the controller is further configured to:
    select a mode of the collision avoidance assistance function based on the determined species of the tetrapod, and
    perform the collision avoidance assistance function according to the selected mode.

3. The collision avoidance assistance device for the vehicle according to claim 1, wherein the controller is further configured to:
    determine a direction, position and movement speed of the tetrapod based on a plurality of images acquired from the camera; and calculate a distribution of future presence probabilities of the tetrapod in a planar area around the vehicle using the behavior characteristics index values of the determined species of the tetrapod and the determined direction, position, and movement speed of the tetrapod.

4. The collision avoidance assistance device for the vehicle according to claim 3, wherein the controller is further configured to:
    calculate a future presence area of the vehicle; and
    determine the probability of the collision between the tetrapod and the vehicle based on the calculated future presence area of the tetrapod and the calculated future presence area of the vehicle.

5. The collision avoidance assistance device for the vehicle according to claim 4 wherein the controller is further configured to:
    calculate a distribution of future presence probabilities of the vehicle in the planar area around the vehicle, and
    determine the probability of the collision between the tetrapod and the vehicle based on the distribution of future presence probabilities of the tetrapod and the distribution of future presence probabilities of the vehicle.

6. The collision avoidance assistance device for the vehicle according to claim 1, wherein:
    the collision avoidance assistance device further comprises a memory, and
    the controller is further configured to retrieve the behavior characteristics index values of the determined species of the tetrapod from the memory.

7. The collision avoidance assistance device for the vehicle according to claim 1, wherein the behavior characteristics index values of the determined species of the tetrapod comprise a movement direction and a movement speed of the tetrapod corresponding to a behavior pattern and a generation probability of the behavior pattern, the behavior pattern being a pattern of behavior that may be expected for the determined species of the tetrapod.

8. The collision avoidance assistance device for the vehicle according to claim 1, wherein the controller is further configured to:
    calculate a future presence area of the vehicle; and
    determine the probability of the collision between the tetrapod and the vehicle based on the calculated future presence area of the tetrapod and the calculated future presence area of the vehicle.

9. The collision avoidance assistance device for the vehicle according to claim 1, wherein the controller is further configured to:
    determine, based on the image of the area around the vehicle, whether the tetrapod is part of a group of tetrapods; and
    in response to the determining that the tetrapod is part of the group of tetrapods, calculate the future presence area of the tetrapod based on group behavior characteristics index values of the tetrapod.

10. A vehicle comprising a collision avoidance assistance device, the collision avoidance assistance device comprising:
    a camera configured to acquire an image of an area around the vehicle; and
    an electronic control device configured to:
    detect an image of a tetrapod in the image of the area around the vehicle, determine a species of the tetrapod detected in the image, retrieve behavior characteristics index values representing behavior characteristics of the determined species of the tetrapod, calculate a future presence area of the tetrapod based on the behavior characteristics index values, determine a probability of a collision between the tetrapod and the vehicle based on the calculated future presence area of the tetrapod, and perform a collision avoidance assistance function based on the determined probability of the collision between the tetrapod and the vehicle.

11. A collision avoidance method for a vehicle, the collision avoidance method comprising:

acquiring an image of an area around the vehicle;

detecting an image of a tetrapod in the image of the area around the vehicle;

determining a species of the tetrapod detected in the image;

retrieving behavior characteristics index values representing behavior characteristics of the determined species of the tetrapod;

calculating a future presence area of the tetrapod based on the behavior characteristics index values;

determining a probability of a collision between the tetrapod and the vehicle based on the calculated future presence area of the tetrapod; and performing a collision avoidance assistance function based on the determined probability of the collision between the tetrapod and the vehicle.

12. The collision avoidance method of claim 11, wherein the detecting the image of the tetrapod in the image of the area around the vehicle comprising detecting an image of a tetrapod in the image of the area around the vehicle.

13. The collision avoidance method of claim 11, further comprising:

selecting a mode of the collision avoidance assistance function based on the determined species of the tetrapod, and performing the collision avoidance assistance function according to the selected mode.

14. The collision avoidance method of claim 11, further comprising:

acquiring a plurality of images of the area around the vehicle;

determining a direction, position and movement speed of the tetrapod based on the plurality of images acquired from the camera; and calculating a distribution of future presence probabilities of the tetrapod in a planar area around the vehicle using the behavior characteristics index values of the determined species of the tetrapod and the determined direction, position, and movement speed of the tetrapod.

15. The collision avoidance method of claim 14, further comprising:

calculating a future presence area of the vehicle; and determining the probability of the collision between the tetrapod and the vehicle based on the calculated future presence area of the tetrapod and the calculated future presence area of the vehicle.

16. The collision avoidance method of claim 15, further comprising:

calculating a distribution of future presence probabilities of the vehicle in the planar area around the vehicle, and determining the probability of the collision between the tetrapod and the vehicle based on the distribution of future presence probabilities of the tetrapod and the distribution of future presence probabilities of the vehicle.

17. The collision avoidance method of claim 11, further comprising pre-storing the behavior characteristics index values in a memory, wherein the retrieving the behavior characteristics index values comprises retrieving the behavior characteristics index values from the memory.

18. The collision avoidance method of claim 11, wherein the behavior characteristics index values comprise a movement direction and a movement speed of the tetrapod corresponding to a behavior pattern and a generation probability of the behavior pattern, the behavior pattern being a pattern of behavior that may be expected for the determined species of the tetrapod.

19. The collision avoidance method of claim 11, further comprising:

determining, based on the image of the area around the vehicle, whether the tetrapod is part of a group of tetrapods; and in response to the determining that the tetrapod is part of the group of tetrapods, calculating the future presence area of the tetrapod based on group behavior characteristics index values of the tetrapod.

* * * * *